(12) United States Patent
Wang et al.

(10) Patent No.: US 10,875,156 B2
(45) Date of Patent: Dec. 29, 2020

(54) CLAMP AND AN ANTI-PIVOT AND LOCK MECHANISM FOR A CLAMP

(71) Applicant: Henry Wang, Winter Springs, FL (US)

(72) Inventors: Henry Wang, Winter Springs, FL (US); Chun-Huan Chuang, Taichung (TW)

( * ) Notice: Subject to any disclaimer, the term of this patent is extended or adjusted under 35 U.S.C. 154(b) by 0 days.

(21) Appl. No.: 16/555,404

(22) Filed: Aug. 29, 2019

(65) Prior Publication Data
US 2019/0381632 A1 Dec. 19, 2019

Related U.S. Application Data

(63) Continuation-in-part of application No. 16/031,541, filed on Jul. 10, 2018.

(60) Provisional application No. 62/618,736, filed on Jan. 18, 2018.

(51) Int. Cl.
| | | |
|---|---|---|
| *B25B 5/00* | (2006.01) | |
| *F16B 2/06* | (2006.01) | |
| *B25B 5/16* | (2006.01) | |
| *B25B 5/06* | (2006.01) | |
| *B25B 5/10* | (2006.01) | |
| *F16B 2/12* | (2006.01) | |

(52) U.S. Cl.
CPC ............. *B25B 5/006* (2013.01); *B25B 5/068* (2013.01); *B25B 5/102* (2013.01); *B25B 5/166* (2013.01); *F16B 2/065* (2013.01); *F16B 2/12* (2013.01)

(58) Field of Classification Search
CPC ......... B25B 5/068; B25B 5/101; B25B 5/102; F16B 2/02; F16B 2/06; F16B 2/065; F16B 2/12
See application file for complete search history.

(56) References Cited

U.S. PATENT DOCUMENTS

| | | | |
|---|---|---|---|
| 140,747 A | | 7/1873 | Walker |
| 280,539 A | | 7/1883 | Watkins |
| 626,604 A | | 6/1899 | Gaff |
| 640,500 A | | 1/1900 | Taylor |
| 884,772 A | | 4/1908 | Sorensen |
| 1,246,563 A | | 11/1917 | Dessez |
| 1,452,753 A | * | 4/1923 | Otto ........................ B25B 5/102 |
| | | | 269/189 |
| 1,533,040 A | * | 4/1925 | Singer ..................... B25B 5/102 |
| | | | 81/145 |
| 1,793,560 A | | 2/1931 | Schmieder |
| 1,929,539 A | * | 10/1933 | Steuernagel ............ B25B 5/102 |
| | | | 269/171.5 |
| 2,568,233 A | | 9/1951 | Hamilton |

(Continued)

OTHER PUBLICATIONS https://www.amazon.com/Strong-Tools-MVDF-44-Adjustable-Magnetic/dp/B00JXDSVA6/ref=pd_bxgy_469_img_2?_encoding=UTF8&pd_rd_i=B00JXDSVA6&pd_rd_r=334a8b60-f193-11e8-acef-0dacba850be4&pd_rd_w=oOBD1&pd_rd_wg=2fnap&pf_rd_i=desktop-dp-sims&pf_rd_m=ATVPDKIKX0DER&pf_rd_p=6725dbd6-9917-451d-beba-16af7874e407&pf_rd_r=18FS1YB0J027DXRE0VVT&pf_rd_s=desktop-d p-.

(Continued)

*Primary Examiner* — Tyrone V Hall, Jr.
(74) *Attorney, Agent, or Firm* — Wolter Van Dyke Davis, PLLC; Robert L. Wolter

(57) ABSTRACT

An anti-pivot and lock mechanism for a clamp including a horizontal post connected and moveable relative to a vertical post. The mechanism engages the vertical post and horizontal post above or below a pivot axis of the horizontal post to prevent or minimize pivoting movement of the horizontal post between changes of consecutive clamped workpieces.

13 Claims, 20 Drawing Sheets

(56) References Cited

U.S. PATENT DOCUMENTS

| | | |
|---|---|---|
| 3,758,100 A | 9/1973 | Taylor |
| 4,867,427 A | 9/1989 | Cunningham |
| 4,901,964 A | 2/1990 | McConnell |
| 5,121,892 A | 6/1992 | Herzog |
| 5,181,702 A | 1/1993 | Pettigrew |
| 5,405,124 A | 4/1995 | Mayer |
| 5,427,364 A | 6/1995 | Zborschil |
| 5,427,365 A | 6/1995 | Torisawa |
| 5,730,434 A | 3/1998 | Schoene |
| 7,114,714 B2 | 10/2006 | Wong |
| 7,721,632 B2 | 5/2010 | Chen |
| 7,896,323 B2 | 3/2011 | Murray |
| 8,282,088 B2 | 10/2012 | Janson |
| 8,439,339 B2 | 5/2013 | Roesch |
| 8,985,566 B2 | 3/2015 | Chuang |
| D788,561 S | 6/2017 | Miller |
| 2003/0102614 A1 | 6/2003 | Foshag |
| 2005/0184439 A1* | 8/2005 | Janson ............ B25B 5/006 269/6 |
| 2014/0165340 A1* | 6/2014 | Chuang ............ F16B 2/12 24/486 |
| 2015/0343607 A1 | 12/2015 | Wang |

OTHER PUBLICATIONS https://www.amazon.com/General-Tools-375-Magnetic-Adjustable/d p/B0000LB68TK/ref=sr_1_13? e=UTF8&qid=1543247825 &sr=8-13&keywords=adjustable+angle+welding+magnet.

https://www.amazon.com/dp/B007Q6YQFQ/ref=sspa_dk_detail_5? psc=1&pd_rd_i=B007Q6YQFQ&pf_rd_m=ATVPDKIK0DER &pf_rd_p=f0dedbe2-13c8-4136-a746-4398ed93cf0f&pd_rd_wg= 6UwWp&pf_rd_r=NMSK7HDTXWJNY1G4B36C&pf_rd_s=desktop-dp-sims&pf_rd_t=40701&pd_rd_w=S94by&pf_rd_i=desktop-dp-sims&pd_rd_r=fcd2583a-f193-11e8-b0b1-33fa73d4a09a.

https://www.amazon.com/Pit-Bull-Adjust-Welding-Holder/dp/B00267Q34W/ref=pd_sim_469_13?_encoding=UTF8&pd_rd_i= B00267Q34W&pd_rd_r=4abf7d07-f193-11e8-9c63-45750980d7ef &pd_rd_w=S8LMJ&pf_rd_wg=SB85j&pf_rd_i=desktop-dp-sims &pf_rd_m=ATVPDKIKX0DER&pf_rd_p=18bb0b78-4200-49b9-ac91-f141d61a1780&p_rd_r=737111CV0WEAMXC1FGQX&pf_rd_s=desktop-dp-.

\* cited by examiner

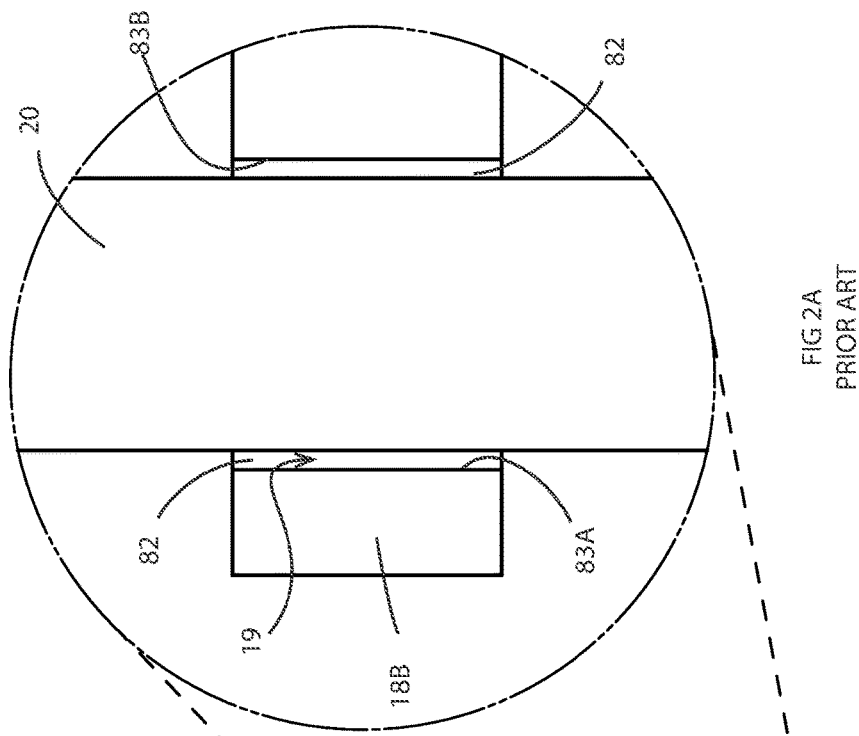
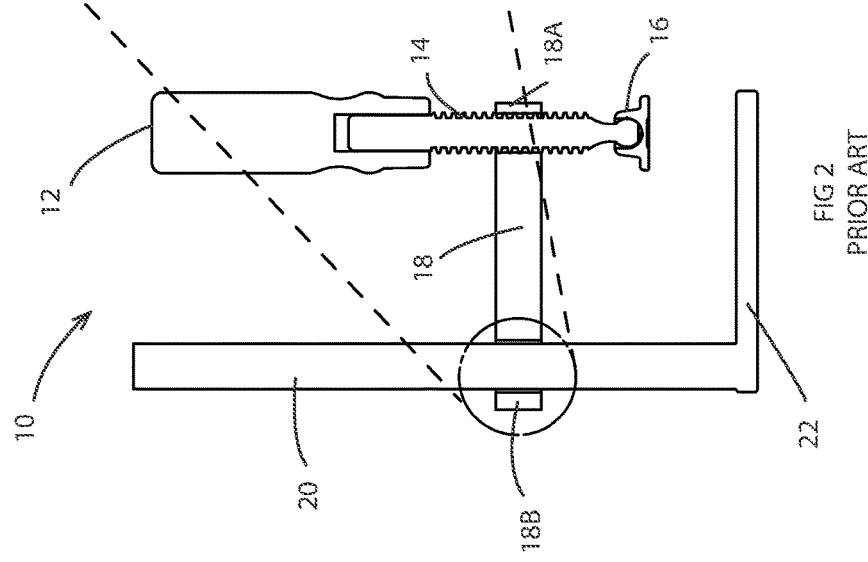
FIG 2A
PRIOR ART
FIG 2
PRIOR ART

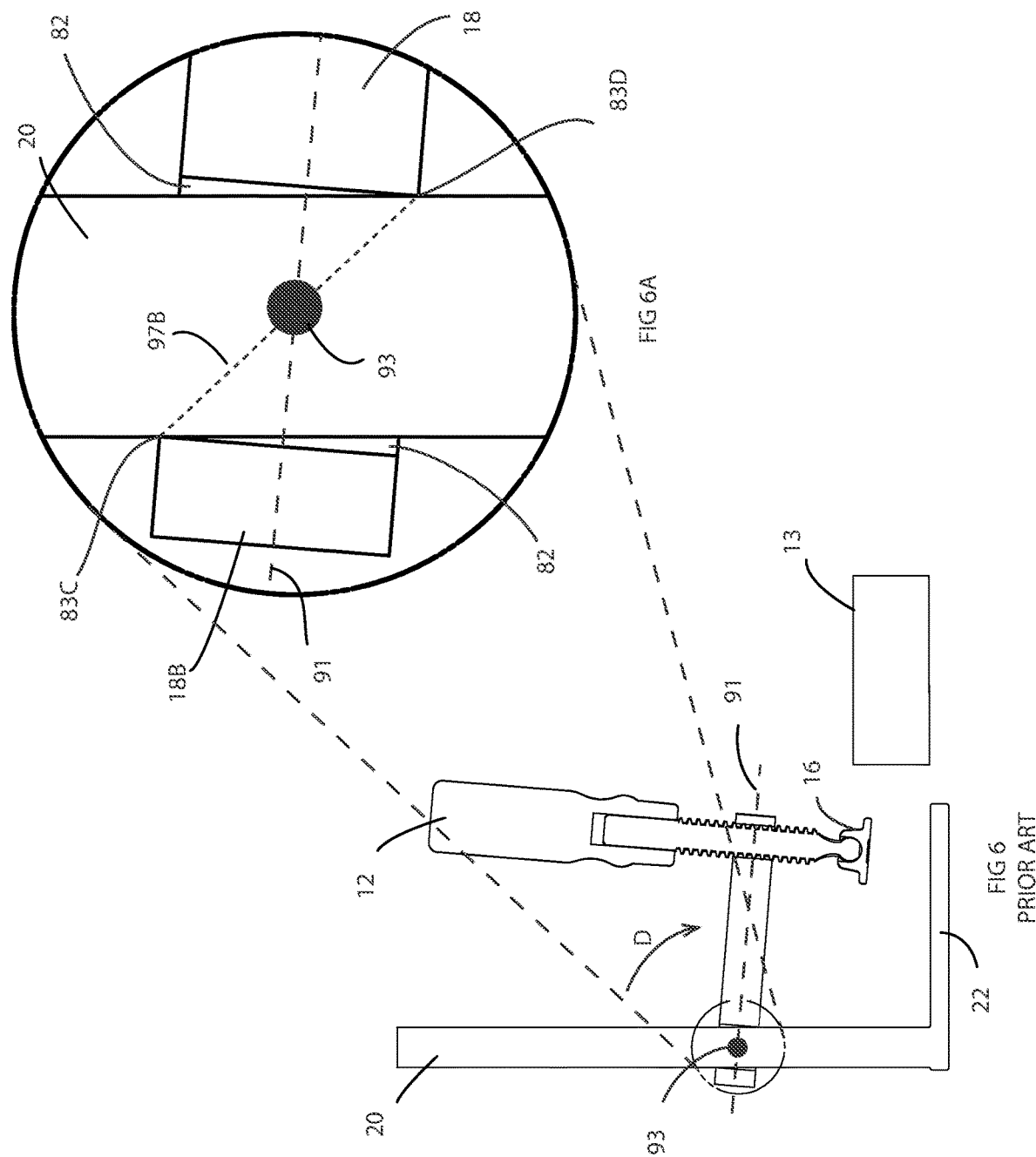

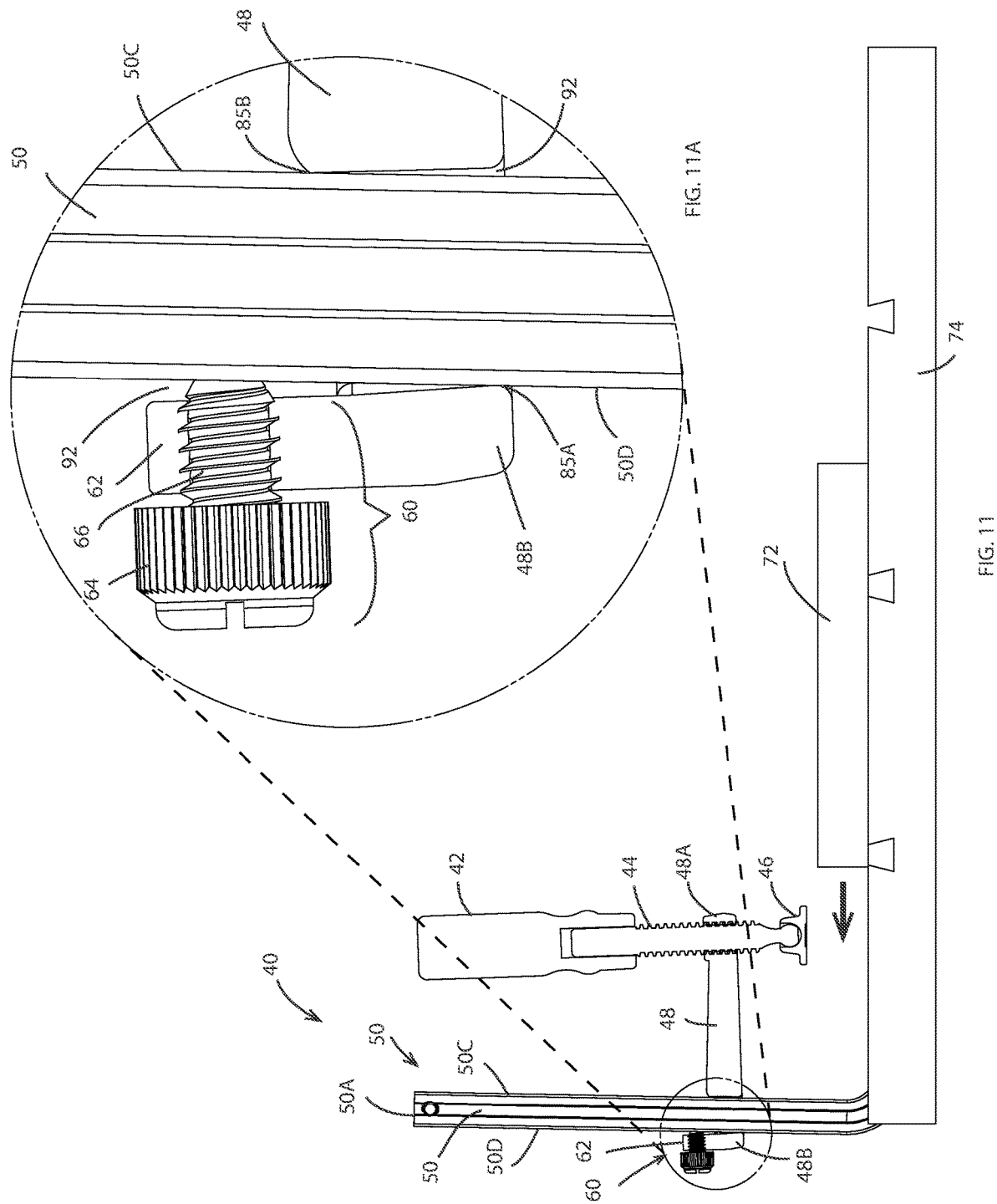

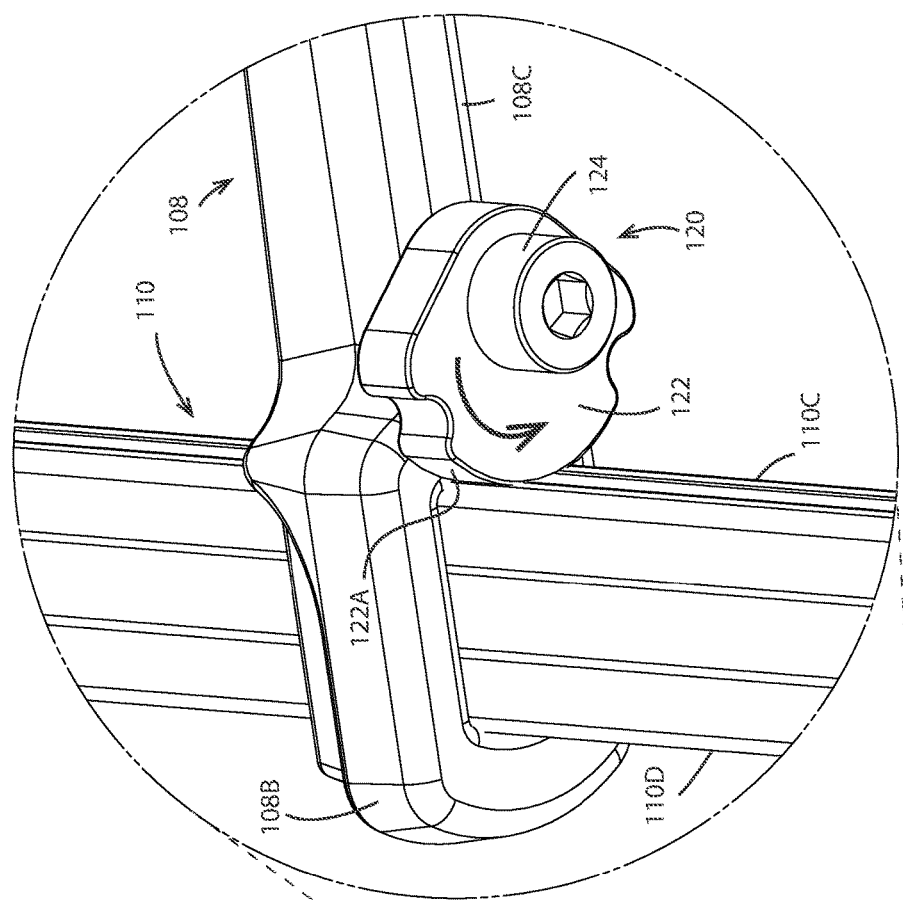
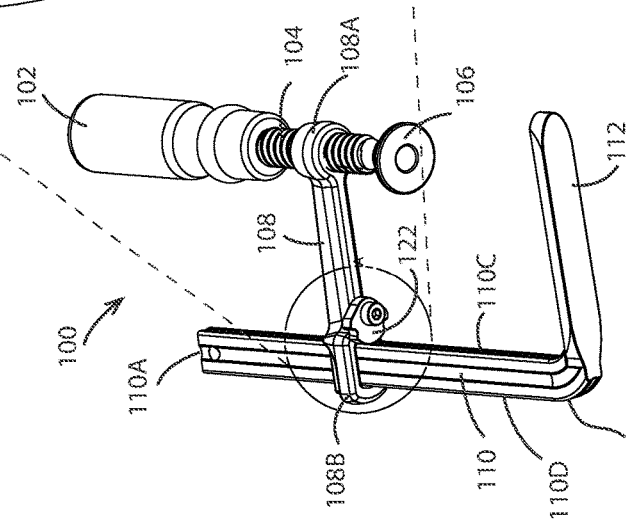
FIG. 12A
FIG. 12

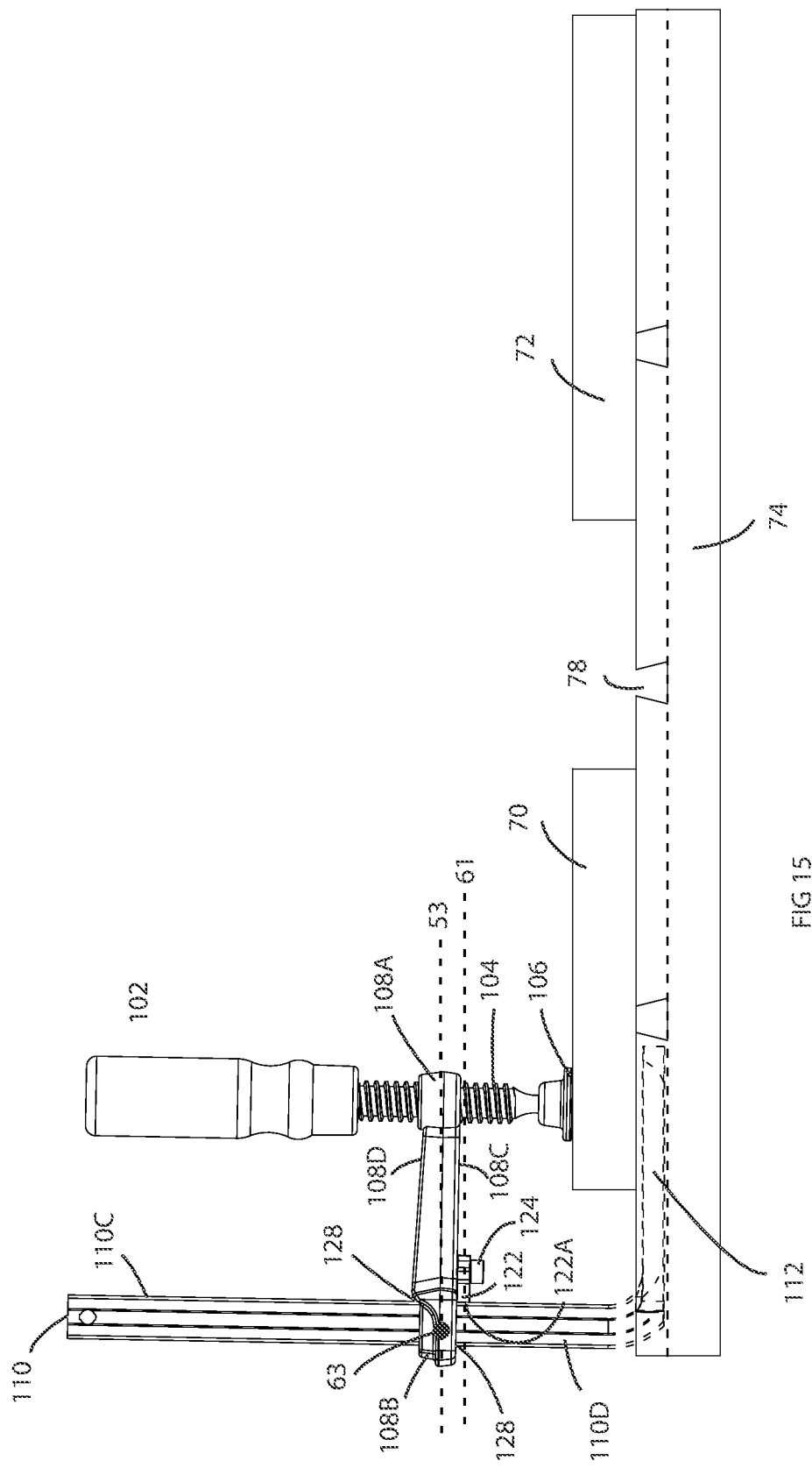

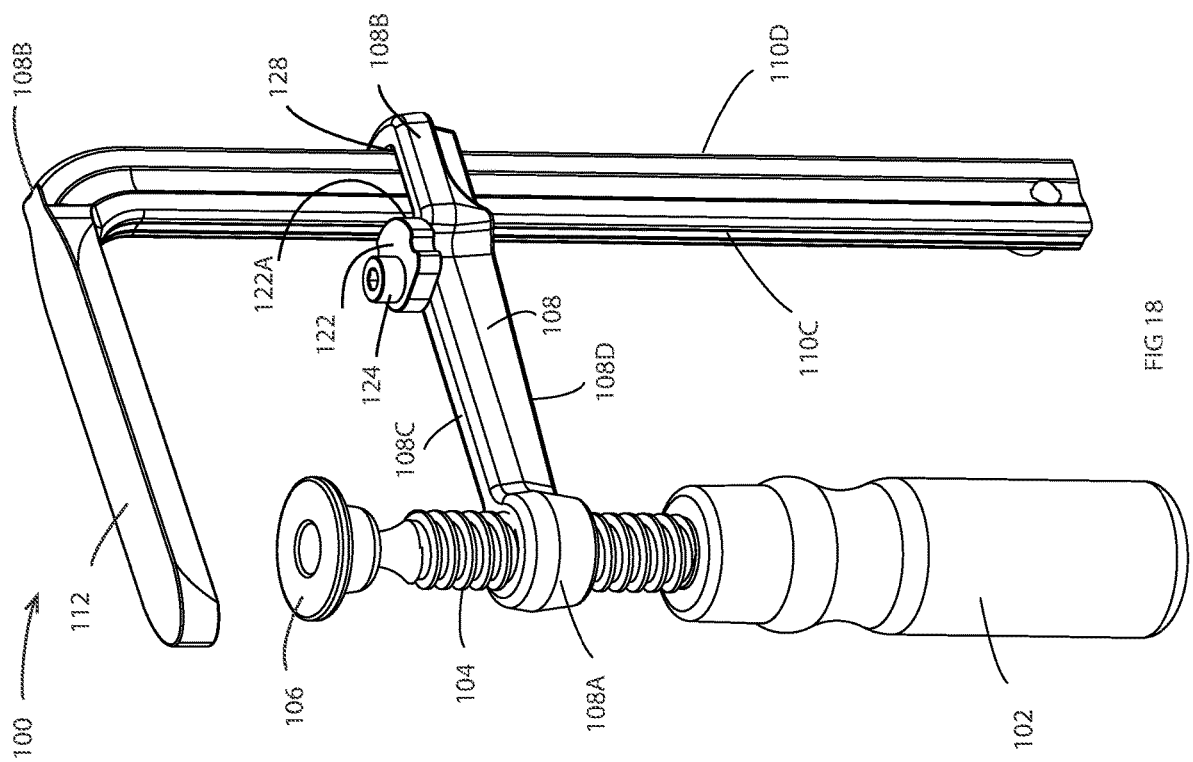

CLAMP AND AN ANTI-PIVOT AND LOCK MECHANISM FOR A CLAMP

BACKGROUND OF THE INVENTION

This invention relates generally to the field of clamping devices used to temporarily secure together two components. More specifically, the invention pertains to F-type clamps that are used to provide additional work surfaces to woodworking apparatuses such as cutting apparatuses or woodworking benches or for clamping a work piece to a component. The invention also relates to various types of clamps that may have similar configurations to that of F-type clamps and may or may not be used for woodworking.

With respect to woodworking apparatuses such as cutting devices (i.e., table saws, routers and band saws), clamps may be used to secure an auxiliary fence to an existing machine fence to provide additional surface area to support work pieces for cutting or to provide a sacrificial fence. Similarly, clamps may be used to affix wood boards to benches to increase working area space. Such auxiliary fences or boards are typically configured so the clamps engage these components and the wood working apparatus in a manner to provide a flush and/or clear working surface. Clamps are also used to secure workpieces directly to work table tops such as the tables of hole punchers, for example.

In reference to FIGS. 1-6B, a prior art F-type clamp 10 is illustrated clamping a work piece 13 to a work panel or table top 11. With respect to FIG. 1, clamps 10 are shown in use with a hand-held router 71. The clamp 10 includes a component engagement member that may further include a handle 12 affixed to one end of a threaded shaft 14 and a clamp head 16 pivotally attached to the other end of the other threaded shaft 14.

A guide arm 18 is provided in threaded engagement with the threaded shaft 14 at a first end 18A thereof and supports a first post 20 at a second end 18B. The first post 20 is connected in linear sliding engagement with the guide arm 18 to accommodate different thicknesses of items to be clamped together. A second post 22 (also referred to herein as "clamping post") is attached to the first post 20 at preferably, substantially 90° and extends toward the clamp head 16.

When clamping two components together, the second post 22 is on an underside of the work panel 11 or disposed within a channel of the work panel 11; and, the clamp head 16 is positioned against the work piece 13 by sliding the first post 20 along the guide arm 18 away from the work piece 13, or sliding the engagement member, including the clamp head 16 toward the workpiece 13 and panel 11. The handle 12 is then rotated thereby rotating the threaded shaft 14 so the clamp head 16 moves linearly toward the second post 22 securing the work piece 13 to the panel 11.

In reference to FIGS. 2 and 2A, the interface between the first post 20 and the second end 18B of the guide arm is shown in more detail. More specifically, the second end 18B has an opening 19 through which the first post 20 slides. In as much as the inside diameter of the opening 19 is larger than an outside diameter of the first post 20, a gap or gaps 82 exists between surfaces of the first post 20 and surfaces of the second end 18B of the opening. Because of gap 82 at the interface of the first post 82 and the second end 18B of guide arm 18, there exists a pivot axis 93 (FIGS. 3A and 3B) of the guide arm 18. When the clamp head 16 is tightened against the work piece 13, the guide arm 18 pivots slightly upward in the direction of arrows A of FIGS. 3, 3A and 3B, and edges 83A, 83B of the guide arm 18 engage the first post 20 along centerline 97A locking the guide arm 18 in position to secure the work piece 13 in place. The guide arm 18 has a longitudinal, central axis 91 that pivots about a pivot axis 93 at the second end 18B of the guide arm 18.

In reference to FIG. 4, after a cut is made to the work piece 13, the handle 12 is rotated to loosen the clamp head 16 relative to the work piece 13 to remove the work piece 13 from the panel 11. If a second work piece of the same thickness as that of the work piece 13 is to be cut, it is desirable that the guide arm 18 remain in position on the first post 20 so that minimal adjustment of the clamp head 16 is required to clamp the second work piece to the router table 11. However, as shown in FIG. 4, often the guide arm 18 may be bumped and slide downward on the post 20 in a downward direction indicated by arrow B, or the guide arm 18 slides on its own without some external force acting against it. In either case, the position of the guide arm 18 on the first post 20, and the position of the clamp head 16 have to be readjusted to receive a second work piece.

With respect to FIG. 5, an F-type clamp 30 is shown including a stop mechanism 41 such as a spring-loaded threaded plunger that is in threaded engagement with an internally threaded hole on the guide arm 38. Such a clamp is disclosed in U.S. Pat. No. 8,985,566. The clamp 30 may be used as described above to clamp a work piece 13 to work panel or table 11. However, when the clamp head 36 is loosened to remove the work piece, the handle 32, threaded shaft 34 and clamp head 36 pivot downward (as represented by arrows "C") so the same work piece 13 or a second work piece of the same thickness cannot fit between the clamp head and work surface of the table 11.

More specifically, a gap exists between the guide arm 38 and the first post 40. Although the stop mechanism 38 may hold the guide arm 18 on the first post 20, the position of the stop mechanism 41 relative to a pivot axis or central longitudinal axis of the guide arm 38, does not prevent the pivot action of the clamp heads 36 and guide arms 38 in the direction of arrows D and toward the clamp post 32.

With respect to FIGS. 6 and 6A, the above described pivoting is shown in more detail and with respect to clamp 30 that does not include a stop mechanism. That is, guide arms 18 that do not have a stop mechanism may also pivot in a direction indicated by arrow D, similar to the clamp 30, without dropping as described above with respect to FIG. 5. In either instance, the guide arm 18, 30 pivots downward about pivot axis 93. The edges or surfaces 83C, 83D of the guide arm 18, 38 engage the front and back sides of the first post 20 as shown, and along center line 97B.

As shown in FIG. 5, a woodworking enthusiast or professional typically uses multiple clamps to secure a work piece 13 to a work panel or table 11. As a user obviously has only two hands, it is difficult to insert a second work piece under the clamp heads 36. Accordingly, a need exists for a clamp that not only includes a locking mechanism for the guide arm, but also a locking mechanism or an additional component that prevents that above-described pivoting action.

SUMMARY OF THE INVENTION

Aspects of the invention relate to clamps, such as F-type or similar clamps, that include a horizontal post (also referred to herein as a "guide arm") connected at one end to a vertical post, and at the other end includes a workpiece engagement member to clamp a workpiece to a surface. Often when the workpiece is removed from engagement with the clamp, the position of the engagement member and horizontal post changes by virtue of the horizontal post pivoting downward, or in some cases sliding on the vertical post. The inventor has developed a novel mechanism(s) that locks the horizontal post relative to vertical post, thereby inhibiting the above-described pivoting action of the horizontal posts. This anti-pivot and locking mechanism can minimize the adjustment and readjustment of the engagement member and/or horizontal post between working on successive workpieces.

Embodiments of the invention may comprise an anti-pivot and lock mechanism that engages the vertical post and guide arm above or below a pivot axis and centerline of the horizontal post.

BRIEF DESCRIPTION OF THE DRAWINGS

These and other advantages of the invention will become more apparent from the following description in view of the drawings. Similar structures illustrated in more than one figure are numbered consistently among the drawings.

FIG. 2 is a side sectional view of a prior art F-type clamp.

FIG. 2A is an expanded view of the clamp of FIG. 2, showing a gap between a first post and guide arm of the clamp.

FIG. 3A is a side sectional of the F-type clamp of FIG. 3.

FIG. 3B is an expanded view of FIG. 3A illustrating the pivot axis of the guide arm.

FIG. 6 is a side sectional view of an F-type clamp with the guide arm having pivoted downward.

FIG. 6A is an expanded view of the F-type clamp of FIG. 6, illustrating more detail of the pivoting movement of the guide arm about this pivot axis.

FIG. 11 is an elevational view of the woodworking clamp of FIG. 10 with the work piece removed, and a second work piece positioned to be inserted between the clamp head and panel.

FIG. 11A is an expanded view of the anti-pivot and locking mechanism in accordance with aspects of the invention.

FIG. 12 is a bottom perspective view of a second embodiment of the invention, including a second embodiment of the anti-pivot and lock mechanism in an engaged position.

FIG. 12A is an expanded view of the clamp of FIG. 12.

FIG. 13A is an expanded view of the clamp of FIG. 13.

FIG. 15 is a side elevational view of the second embodiment of the invention in connection with a work panel or table top.

FIG. 18 is a perspective view of the second embodiment with the clamp oriented so that the clamp head faces upward.

DETAILED DESCRIPTION OF THE INVENTION

In describing particular features of different embodiments of the present invention, number references will be utilized in relation to the figures accompanying the specification. Similar or identical number references in different figures may be utilized to indicate similar or identical components among different embodiments of the present invention.

It is to be noted that the terms "first," "second," and the like as used herein do not denote any order, quantity, or importance, but rather are used to distinguish one element from another. The terms "a" and "an" do not denote a limitation of quantity, but rather denote the presence of at least one of the referenced item. Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. As a non-limiting example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 7. It is to be noted that all ranges disclosed within this specification are inclusive and are independently combinable.

The inventor of the subject invention has developed an F-type clamp that includes an anti-pivot and lock mechanism that holds the guide arm and clamp head in stable position so the position of the guide arm and clamp head relative to a work surface does not have to be adjusted during use for example with multiple workpieces of the same thickness. The anti-pivot and lock mechanism is selectively adjustable relative to a first post of the clamp to engage the first post at a point are area that offset relative to a pivot axis of the guide arm and offset relative to a central axis of the guide arm.

Aspects of the invention may include a thumb screw selectively adjustable relative to the first post and the thumb screw has a central axis that is offset relative to the pivot axis or central axis of the guide arm toward a first end or second end of a clamping post of the F-type clamp.

Another aspect of the invention involves an anti-pivot and lock mechanism that includes an adjustable cam disc that is selectively adjustable selectively adjustable relative to the first post and engages the first post at a point or area that is offset relative to the pivot axis or central axis of the guide arm toward a first end or second end of a clamping post of the F-type clamp.

Figure 1:
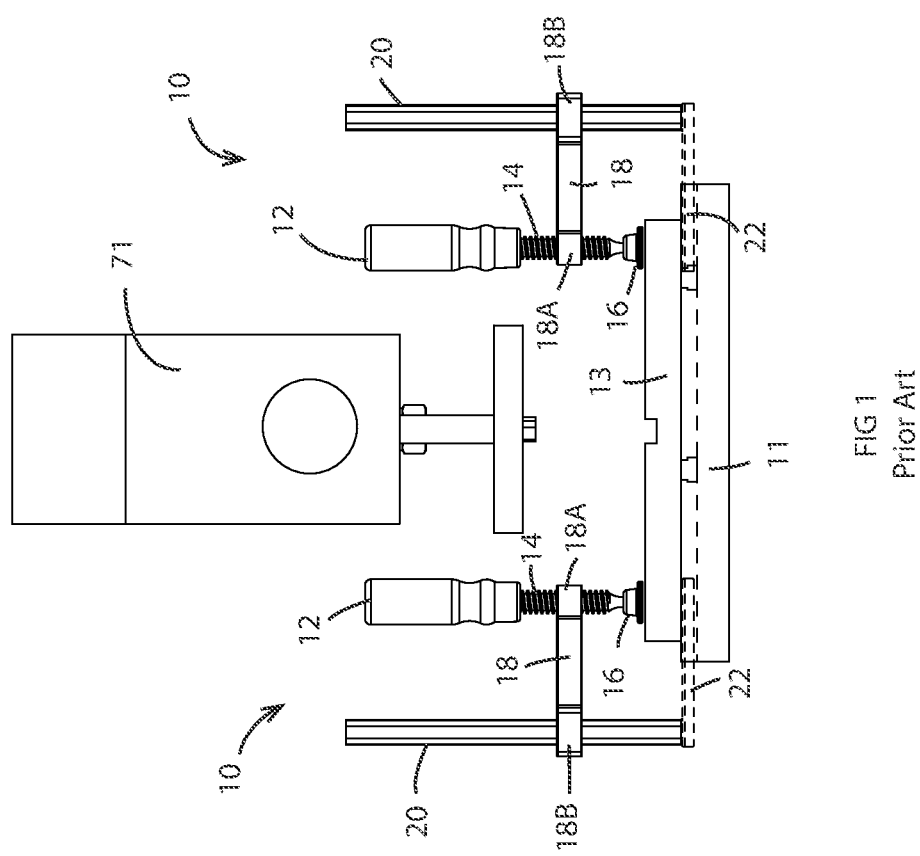
FIG. 1 is a side elevational view of prior art F-type clamps on a work panel or table top with a work piece.
Figure 3:
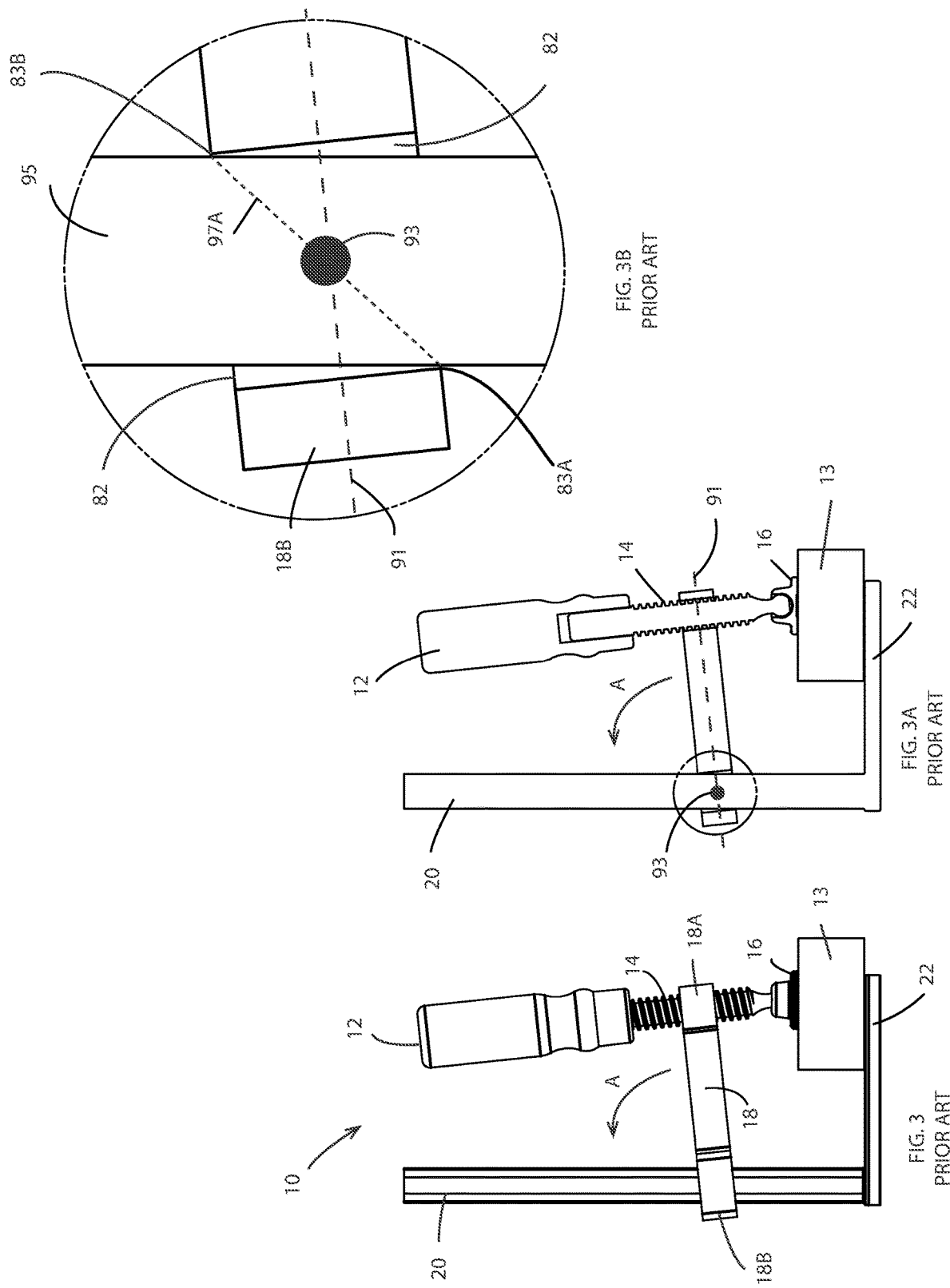
FIG. 3 is a side elevational view of the prior art F-type clamp showing a pivoting relationship of the guide arm relative to the first post.
Figure 4:
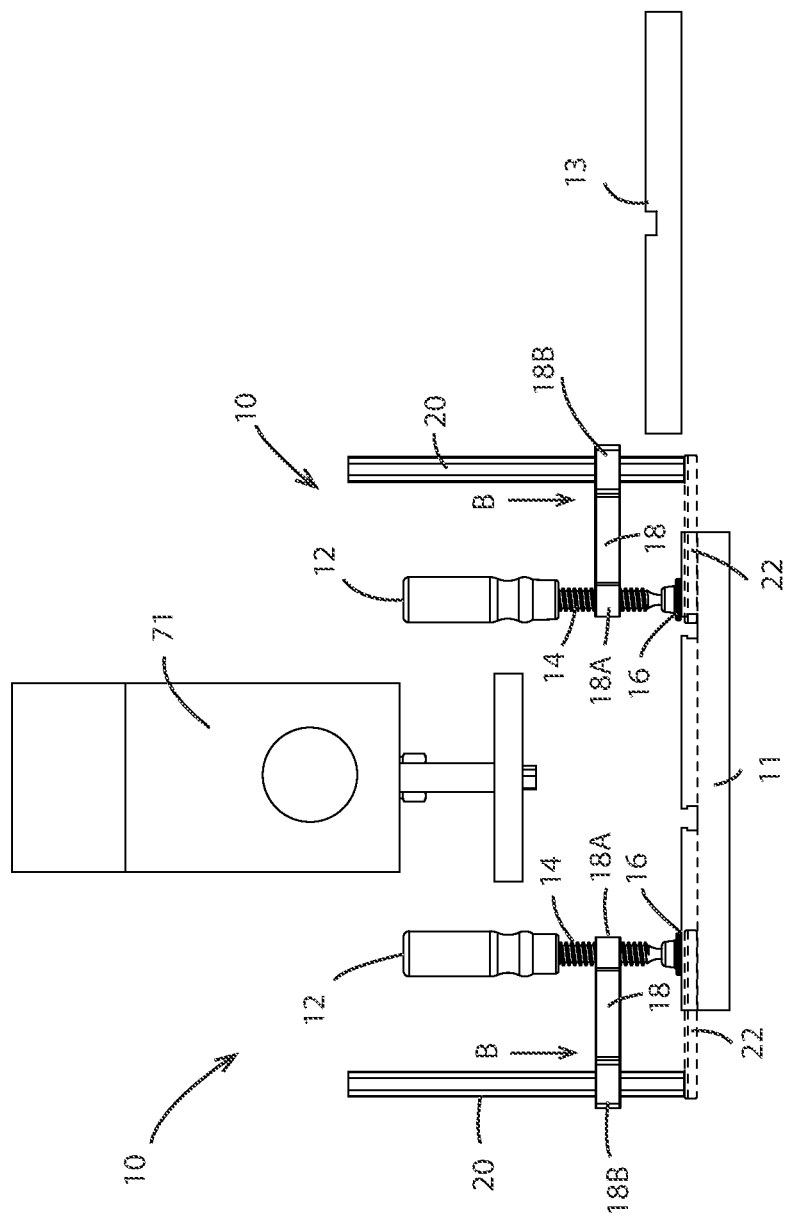
FIG. 4 is a side elevational view of the prior art clamp of FIG. 1 with the work piece removed and the guide arm having slipped downward.
Figure 5:
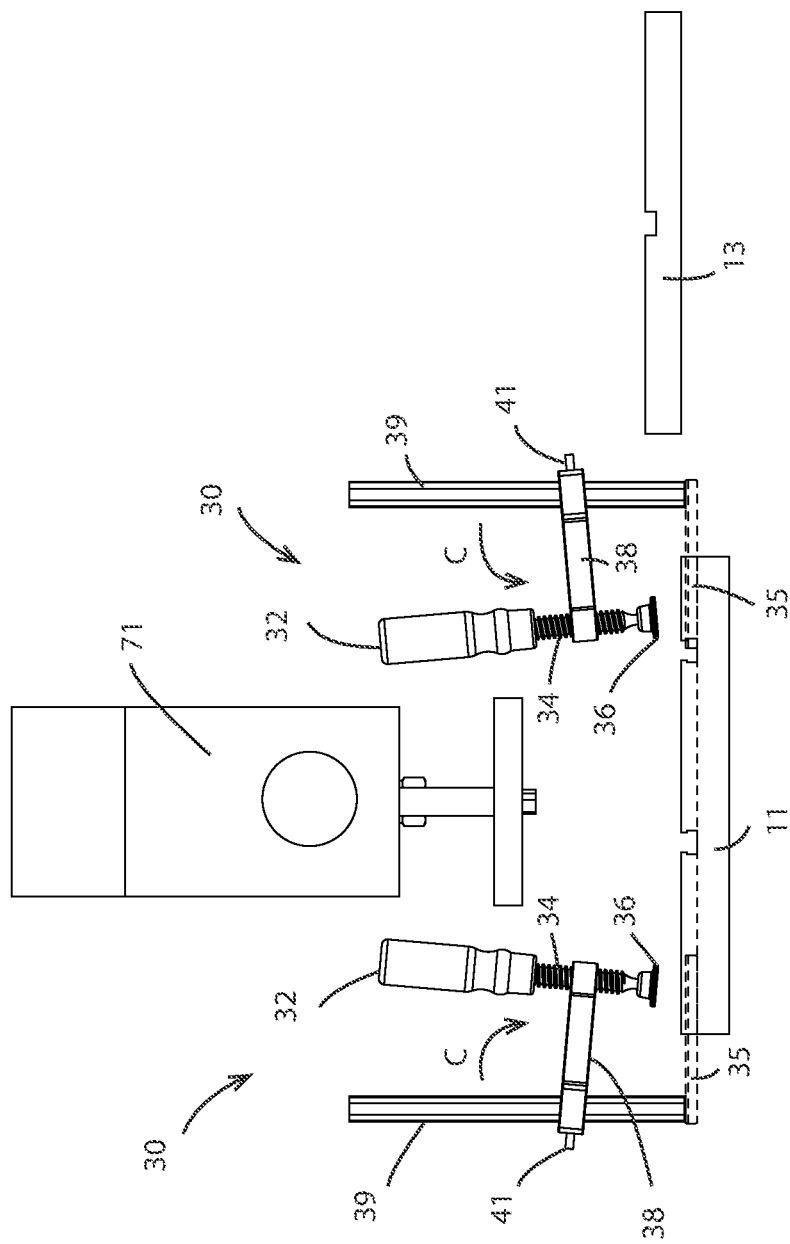
FIG. 5 is a side elevational view of a prior art clamp with a lock mechanism with the work piece removed and the clamp head having pivoted downward.
Figure 8:
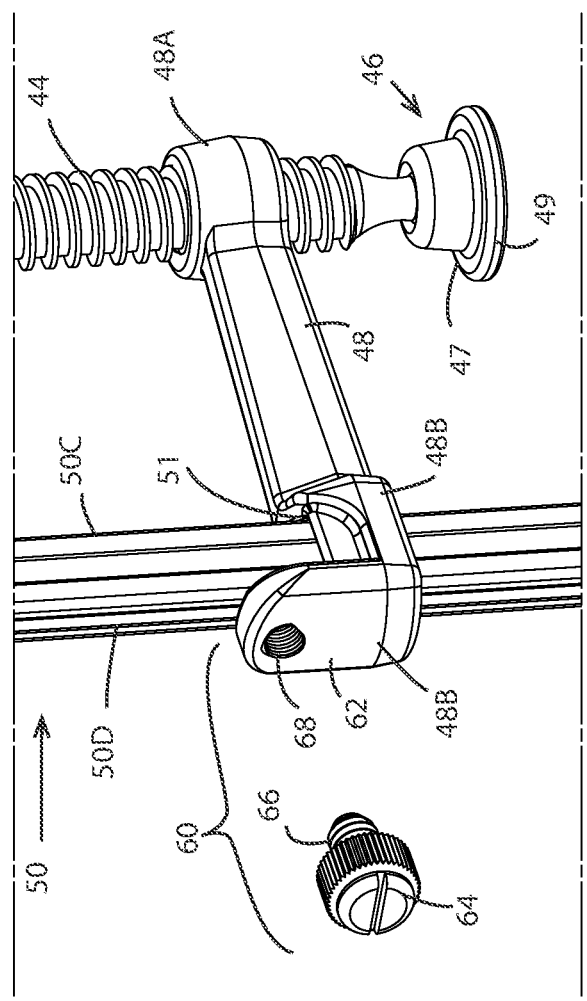
FIG. 8 is an exploded perspective view of the anti-pivot and lock mechanism for the woodworking clamp in accordance with aspects of the invention.
Figure 7:
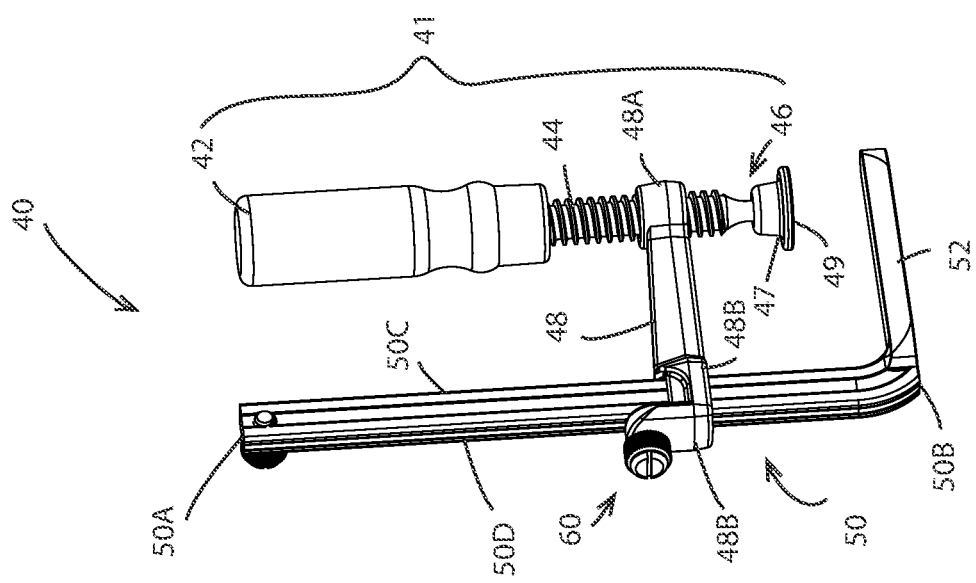
FIG. 7 is a perspective view of a woodworking clamp with an anti-pivot and lock mechanism in accordance with aspects of the invention.

In reference to FIGS. 7 and 8, a clamp 40 is illustrated and includes a component engagement member 41 that may further include a handle 42 affixed to one end of a threaded shaft 44 and a clamp head 46 pivotally attached to the other end of the other threaded shaft 44. In an embodiment, the clamp head 46 may include a disc 47 fabricated from a metal alloy such as stainless steel and a cap member 49 fitted over the disc member 47. The cap member 49 may be fabricated from a natural or synthetic rubber, or a plastic material. Embodiments may include the clamp head 46 pivotally interconnected to the shaft 44. By way of example, a ball and socket type joint (not shown) may be provided so the clamp head 46 pivots relative to the shaft 44.

A guide arm 48 is provided in threaded engagement with the threaded shaft 44 at a first end 48A thereof and supports a first post 50 at a second end 48B. The first post 50 is connected in linear sliding engagement with the guide arm 48 to accommodate different thicknesses of items to be clamped together. More specifically, the second end 48B of the guide arm 48 has an opening 51 (FIG. 8) through which the first post 50 extends and is selectively slidable therein or there through to different positions to accommodate different size work pieces for clamping. The first post 50 has a first end 50A and a second end 50B, and has a first side 50C facing the component engagement member 41 and a second side 50D opposite to the first side 50C and facing away from the component engagement member 41.

A second post 52 (also referred to herein as "clamping post") is attached to the second end 50B of the first post 50 and preferably, substantially 90° and extends toward the clamp head 46. The term "substantially" or "generally" perpendicular means within ±5° of 90°, and preferably within ±2° of 90°. The first post 50 and second post 52 may be separate parts that are welded together, or other fastening mechanisms may be used to secure the posts, 50, 52 together. Alternatively, the first and second posts 50, 52 may be forged or made as a single integral component.

As will be explained in more detail below, in an embodiment when clamping two components together, the second post 52 is inserted into a channel of an auxiliary (or second) component to be clamped to a wood working apparatus. The second or auxiliary component, which may be a wooden member with one or more channels, is positioned against a surface, such as a fence of a table or table saw or router table (or a first component), and the clamp head 46 is positioned on the auxiliary component by sliding the guide arm 48 along the first post 50, or sliding the engagement member 41 and guide arm 48, including the clamp head 46, toward a work piece on the first and/or second components. The handle 42 is then rotated thereby rotating the threaded shaft 44 so the clamp head 46 moves linearly toward the workpiece securing the workpiece to the first and/or second components.

The clamp 40 and auxiliary or second component (also referred to as a "work panel") may be of the type described in U.S. Pub. No. 2015/0343607, which is incorporated herein by reference in its entirety. More specifically, the second post 52 and channel of the work panel may have cross-section trapezoid shapes, also referred to as a dovetail shape.

Figure 9:
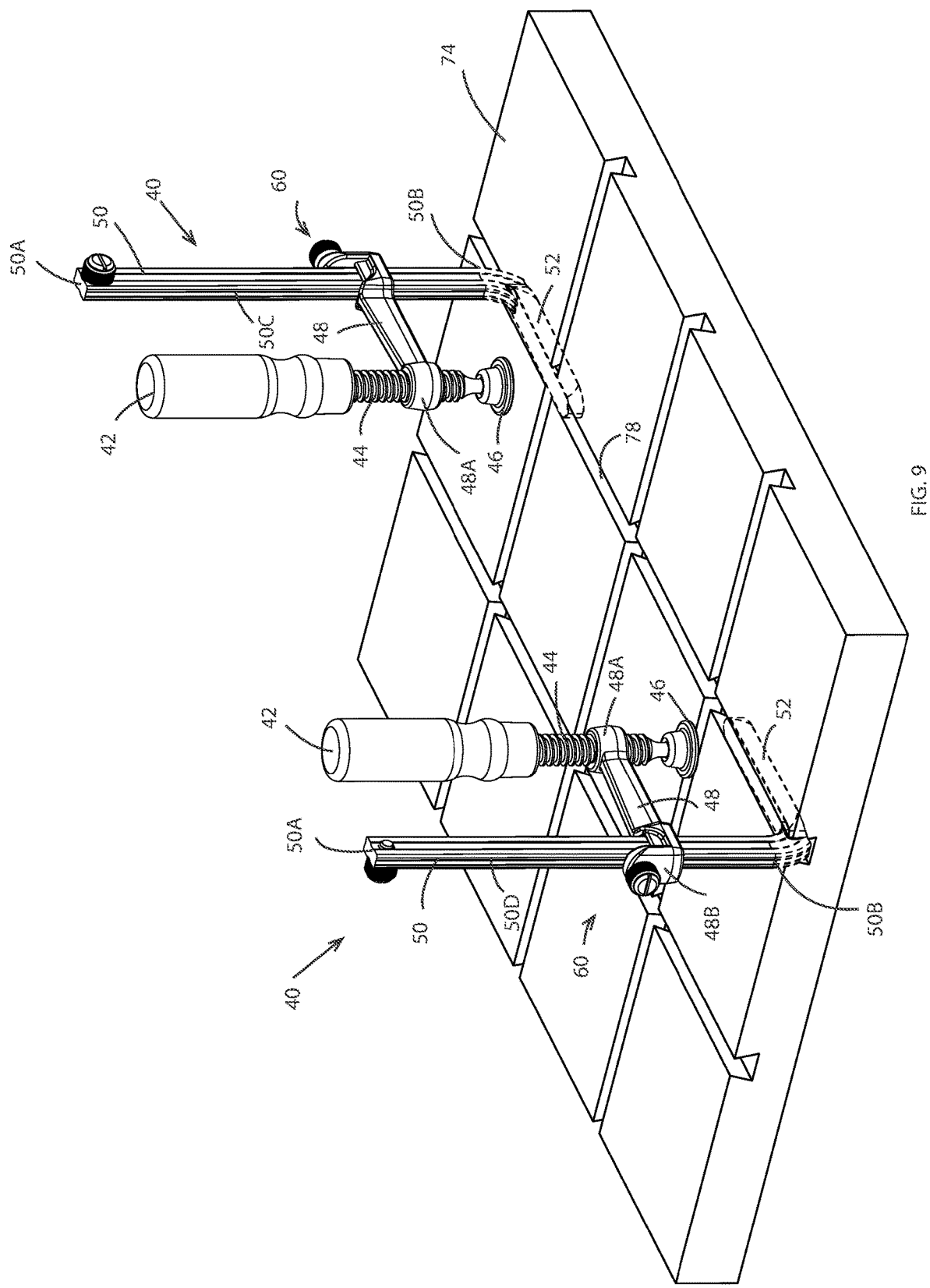
FIG. 9 is a perspective view of the clamp in accordance with aspects of the invention positioned on a work panel.
Figure 10:
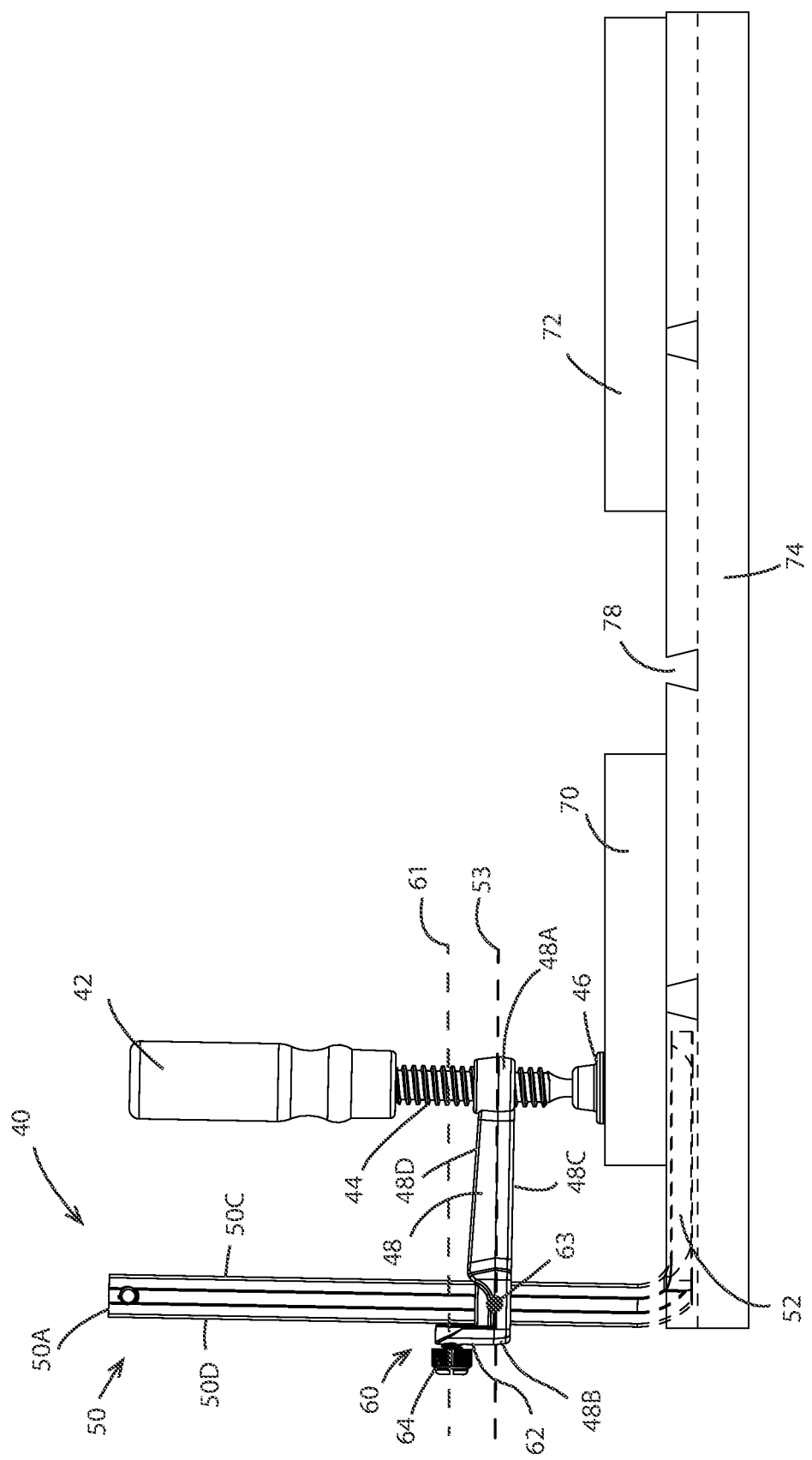
FIG. 10 is a side elevational view of the woodworking clamp, in accordance with aspects of the invention, on a work panel with a work piece and the anti-pivot and lock mechanism engaging the guide arm.

While aspects of the invention are shown in connection with an auxiliary work component, panel or surface as shown in FIGS. 9-11, the invention may also be used to secure work pieces or other components directly to a work table, such as a table of hole punch or other work surface.

The threaded shaft 44 acts as a gear mechanism operatively connected to the guide arm 48 to facilitate relative movement of the clamp head 46, guide arm 48 and clamping post 42 to clamp two components together. While embodiments described herein include the guide arm 18 attached in threaded engagement with the threaded shaft 44 for adjustment of the second post 52 relative to the clamp head 46, the invention is not so limited, and may include other gear mechanisms or other clamping mechanisms. For example, the guide arm 48 may be operatively connected to a handle that has a lock and ratcheting mechanism to position the second post 52 relative to the clamp head 46 such as incorporated in the Quick Clamp sold by Festool. In addition, the term handle is intended to cover any type of gripping member that allows manipulation of the clamp 40, such as a knob. To that end, the invention is not limited to a rotatable handle connected to a threaded shaft.

As described above, in some instances when performing wood working tasks it may be beneficial for the guide arm 48 to be locked in position relative to the first post 50, or vice versa. This may be the case when one is working with multiple work pieces that have the same thickness dimension. In an embodiment shown in FIGS. 7-11, an anti-pivot and lock mechanism 60 may be operatively connected to the guide arm 48 and first post 50 to lock these components in position relative to one another, and lock the clamp head 46 in a position. The mechanism 60 also prevents the guide arm 48 from pivoting relative to the first post 50, as described above with respect to the prior art F-type clamps.

As illustrated, a tab 62 is connected to the second end 48B of the guide arm 48 adjacent to the second side 50D of the first post 50, or along the second side 50D of the first post 50. In this embodiment, the tab 62 extends toward a first end 50A of the first post 50 that is opposite to the second end 50B at which the second post 52 is disposed. The anti-pivot and locking mechanism 60 may include a screw type fastener, such as a thumb screw that includes a disc 64 and an externally threaded portion 66 that is at least partially disposed within an internally threaded aperture 68 in the tab 62.

The disc 64 may be grasped and rotated so the locking mechanism 60 is selectively adjustable within the aperture 68 relative to the second side 50D of the first post 50. In this manner, the guide arm 48 can be locked in a desired position. For example, as shown in FIG. 10, two workpieces 70, 72 having the same thickness dimension "T" are positioned on a work panel or table top 74 for cutting. An auxiliary work panel 74 (FIGS. 9 and 10) is clamped to the table to support the workpieces 70, 72 for cutting. The panel 74 includes a plurality of channels 78 configured to receive the second post 52 of the clamp 40. The workpiece 70 is inserted between a top surface of the work panel 74 and the clamp head 46, and the handle 42 is rotated to fix the head clamp 46 against the work piece 70. The locking mechanism 60 is actuated to secure the guide arm 48 in a desired position.

As shown in FIG. 11, after a cut is made in the first workpiece 70, the first workpiece 70 is removed; however, the guide arm 48 remains in position relative to the first post 50 and second post 52 so the clamp head 46 is positioned to receive the second workpiece 72. No further adjustment is required of the guide arm 48, and clamp head 46 to receive the second workpiece 72 on the table or work panel 74, because the locking mechanism 50 locks the guide arm 48 in position and prevents or restricts pivoting of the guide arm 48 and clamp head 46. The guide arm of prior art clamps having a similar F-type configuration often slip, or pivot, between cutting different workpieces and the guide arm must be readjusted between cuttings. With the novel invention disclosed herein, if any readjustment is necessary, it may be to slightly tighten the clamp head 46 against the workpiece 72.

Again in reference to FIG. 10, the guide arm 48 has a central axis 53 from its first end 48A to its second end 48B. As shown, the locking mechanism 60 has a central axis 61 that is offset relative to the central axis 53 of the guide arm 48. The central axis 53 of the guide arm 48 is a longitudinal axis passing through the center of the guide arm 48 from the first end 48A to the second end 48B thereof. In addition, or alternatively, the central axis 61 of the locking mechanism 60 may be offset relative to a pivot axis 63 of the guide arm 48, which pivot axis 63 is perpendicular to the central axes 53, 61. In this embodiment, the central axis 61 is offset toward the first end 50A of the first post 50. In another embodiment, the central axis 61 may be offset toward the second end 50B of the first post 50. In such an embodiment, the tab 62, for example, may extend toward the second end 50B of first post 50.

Described in another manner, the central axis of the 61 of the mechanism 60 may be above or below sides or surfaces 48C or 48D, depending on the position of the mechanism 60 or the orientation of the clamp 40

In either embodiment, a gap 92 (FIG. 11A) is formed between a surface of the tab 62 or a surface of the second end 48B of the guide arm 48 facing the second side 50D of the first post 50, and the threaded portion 66 of the lock mechanism 60 spans the gap 92 between the tab 62 and first post 50. Absent the anti-pivot and lock mechanism 60, this gap 92 enables the pivoting action of the guide arm 48 and clamp head 46 as described above with respect to the prior art F-type clamps.

In reference to FIG. 11, the first work piece 70 has been removed and the second work piece 72 is shown positioned for insertion between the clamp head 46 and the work panel 74. As shown, the guide arm 48 and clamp head 46 remain in position such that the clamp head 46 does not pivot downward so the second work piece 72 can be readily inserted between the clamp head 46 and the work panel 70.

The interface between the anti-pivot/lock mechanism 60 and the first post 50 and guide arm 48 is shown in more detail with respect to FIG. 11A. As shown, the threaded member 66 spans the gap 82 to contact the second side 50D of the post 50. As the anti-pivot/lock device 60 is screwed against the second side 50D of post 50, the tab 62 is pulled away from the post 50 slightly pivoting the guide arm 48 until guide arm 48 or second end 48B of the guide arm 48 engages the first and second sides 50C, 50D of the post at contact areas or edges 85A, 85B thereby locking the guide arm 48 against the post 50. In addition, this particular arrangement prevents or inhibits the downward pivoting of the guide arm 48 and clamp head 46 as described above with respect to the prior art F-type clamps.

Figure 17:
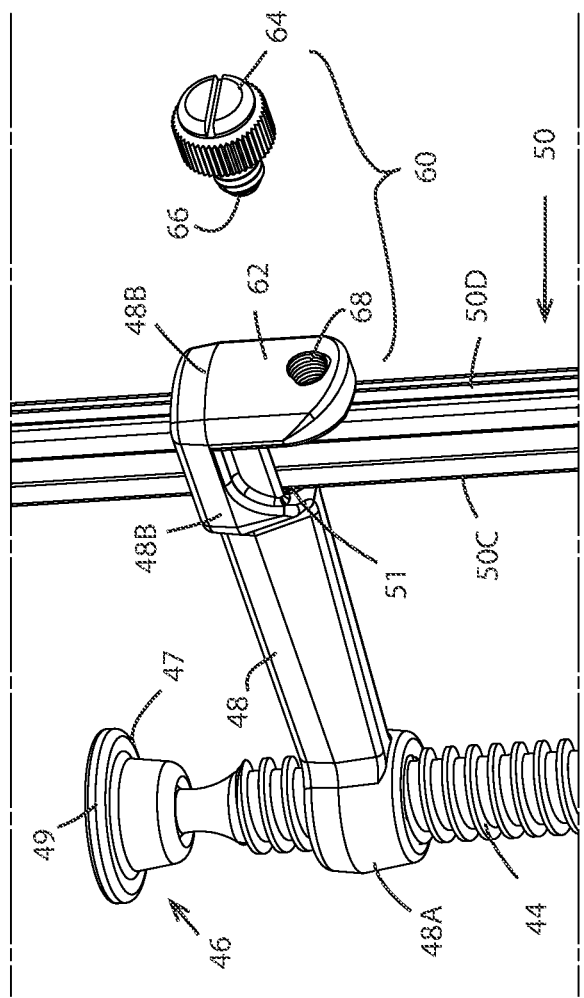
FIGS. 16 and 17 are perspective views of the first embodiment with the clamp oriented so that the clamp head faces upward.
Figure 16:
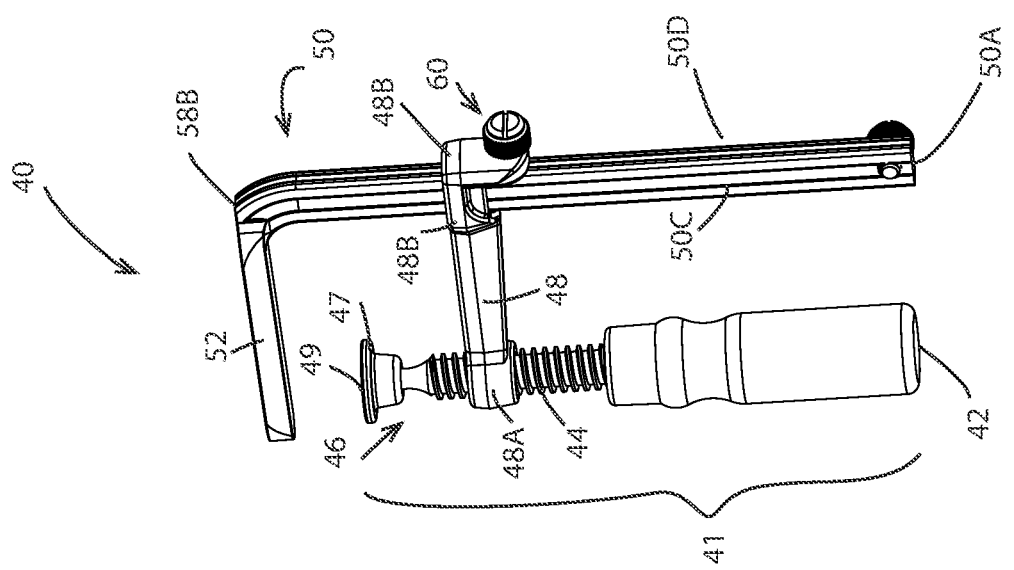

With respect to the embodiment shown in FIGS. 7-12A, the clamp 40 is positioned relative to workpieces 70, 72 and work panel or table top 74 with the clamp head 46 facing downward and the handle 42 extending upward; however, the invention for the clamp 40 is not so limited. As shown in FIGS. 16 and 17, the clamp 40 is operational when the clamp head 46 is facing upward and the handle 42 is extending downward.

In addition, while the tab 62 is shown disposed or protruding toward the first end 50A of the first post 50, embodiments may include the tab 62 disposed or protruding toward the second end 50B of the first post 50 or toward the clamping post 52. In this manner, the central axis of the anti-pivot and locking mechanism is offset relative to the central axis 53 of the guide arm 48 and pivot axis 63 of the guide arm 48 toward the second end 50B of the first post 50 or toward the clamping post 52.

Figure 13:
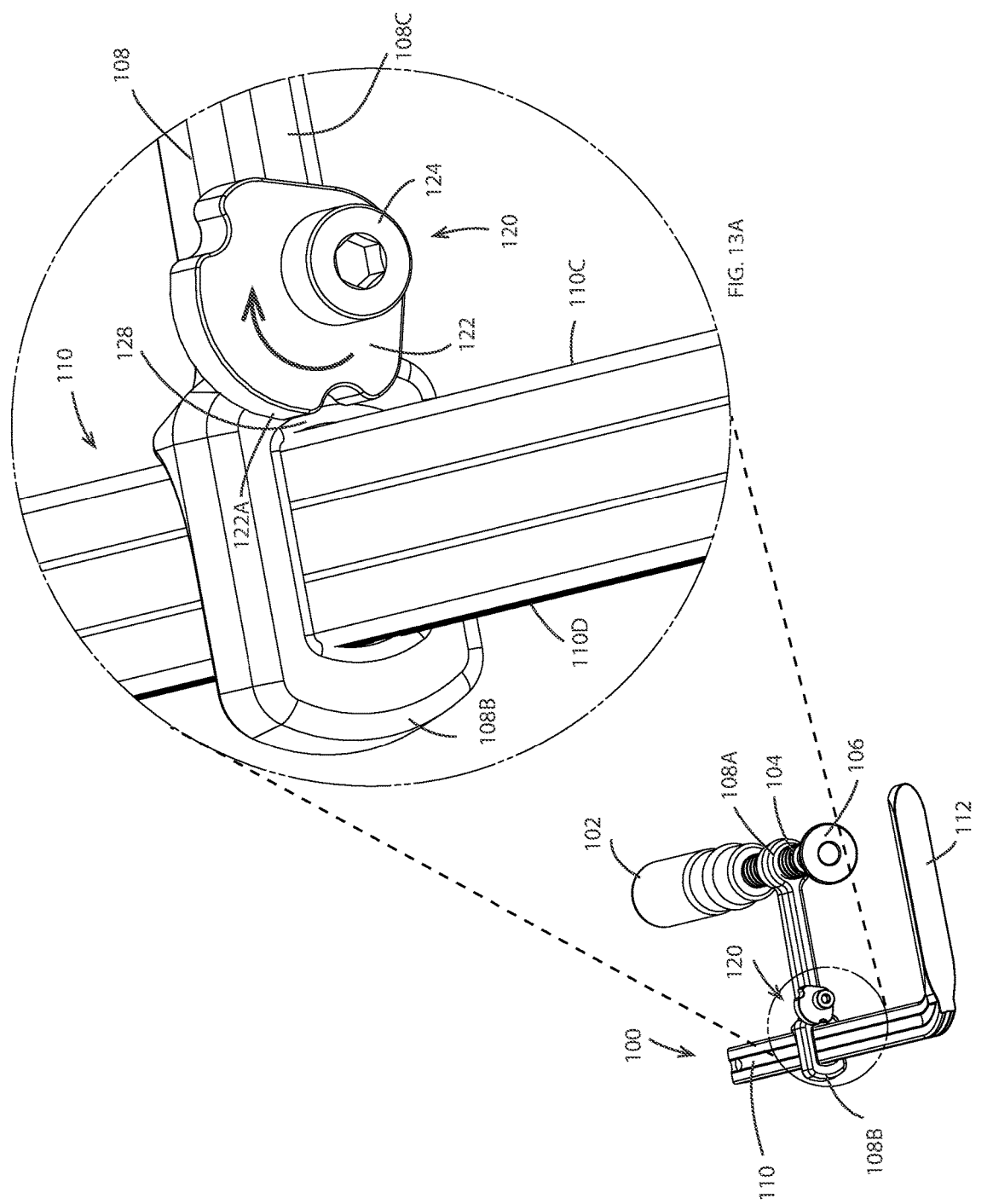
FIG. 13 is a bottom perspective view of the second embodiment of the invention, including a second embodiment of the anti-pivot and lock mechanism in a disengaged position.
Figure 14:
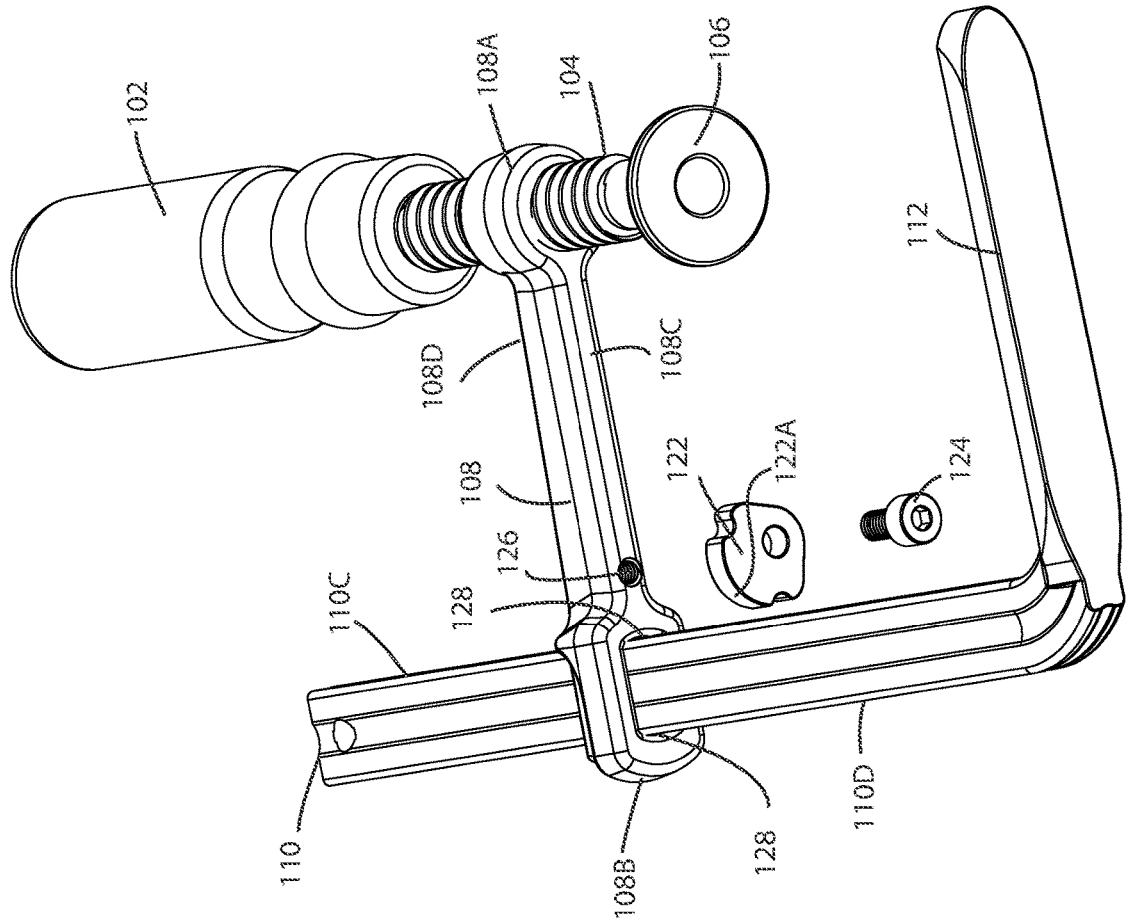
FIG. 14 is an exploded view of the second embodiment of the invention.

FIGS. 12-14 illustrate a second embodiment of the invention in which the clamp 100 includes an anti-pivot and lock mechanism 120. The clamp 100 has a similar configuration to that of the above described clamp 10, including handle 102, threaded shaft 104 and clamp head 106. In addition, the clamp 100 includes guide arm 108 in threaded engagement with the threaded shaft 104 at a first end 108A and in linear sliding engagement with first post 110 at its second end 108B. The clamp 100 further includes the clamping post 112 at an end of the first post 110. The first post 110 has a first side 110C facing the clamp head 106 and a second side 110D opposite the first side 110C.

The anti-pivot and lock mechanism 120 shown for example in FIGS. 12 and 12A is operatively connected to the guide arm 108 and depending on its position, operatively connected to the first post 110. More specifically, the anti-pivot and lock mechanism 120 engages the first side 110C of the first post 110 below the guide arm 108, or below a pivot axis or below a longitudinal, central axis of the guide arm 108. In as much as the first post 110 is slidable within or through the second end 108B of the guide arm 108, a gap 128 exists between the first post 110 and the second end 108B of the guide arm 108. As described above, the guide arm 108 has a tendency to pivot down when replacing work pieces.

To that end, the anti-pivot and lock mechanism spans the gap 128 (FIG. 13A) to prevent pivoting of guide arm 108. The anti-pivot and lock mechanism includes a cam disc 122 pivotally attached to an underside 108C of the guide arm 108 and a bolt 124 is in threaded engagement with an internally threaded aperture 126 (FIG. 14) of guide arm 108. With respect to FIG. 12A, the anti-pivot and lock mechanism 120 is shown in an engaged position wherein the cam disc 122 spans the gap 128 between the guide arm 108 and the first post 110, whereby a side surface 122A abuts or engages the first side 110C of first post 110 thereby preventing downward pivot of the guide arm 108 relative to the first post 110. Note, that the guide arm 108 should engage the first post 110 as described above with respect to FIGS. 10, 11, and 11A. More specifically, a gap 128 exists between the end 108B of the guide arm 108, and the cam 122 or side surface 122A engages the first post 110 above or below the central axis 53 of the guide arm 108 or above or below the pivot axis 63 of the guide arm as shown in FIG. 15 and depending on the orientation of the clamp 100.

With respect to FIGS. 13 and 13A, the anti-pivot and lock mechanism 120 is shown in a disengaged position, whereby the position of the first post 110 and clamp post 112 can be selectively and linearly adjusted relative to the guide arm 108 and clamp head 106. Once the first post 110 and clamp post 112 are appropriately positioned relative to the clamp head 106 to receive a work piece, the cam disc 122 is rotated or pivoted to engage the first side 110C of the first post 110 to lock the guide arm 108 in position and prevent downward pivot thereof.

With respect to the embodiment shown in FIGS. 12-15, the clamp 100 is positioned relative to workpieces 70, 72 and work panel or table top 74 with the clamp head 106 facing downward and the handle 102 extending upward; however, the invention for the clamp 100 is not so limited. As shown in FIG. 18 the clamp 100 is operational when the clamp head 106 is facing upward and the handle 102 is extending downward.

In addition, while the cam 122 is shown disposed under the guide arm 108 adjacent side 108C and toward second end 110B the first post 110, embodiments may include the cam 122 disposed on the other side 108D of the guide arm 10 disposed toward the first end 110B of the first post 110. In this manner, cam 122 is offset relative to the central axis 53 of the guide arm 48 and pivot axis 63 of the guide arm 48 toward the first end 110A of the first post 110.

Figure 19:
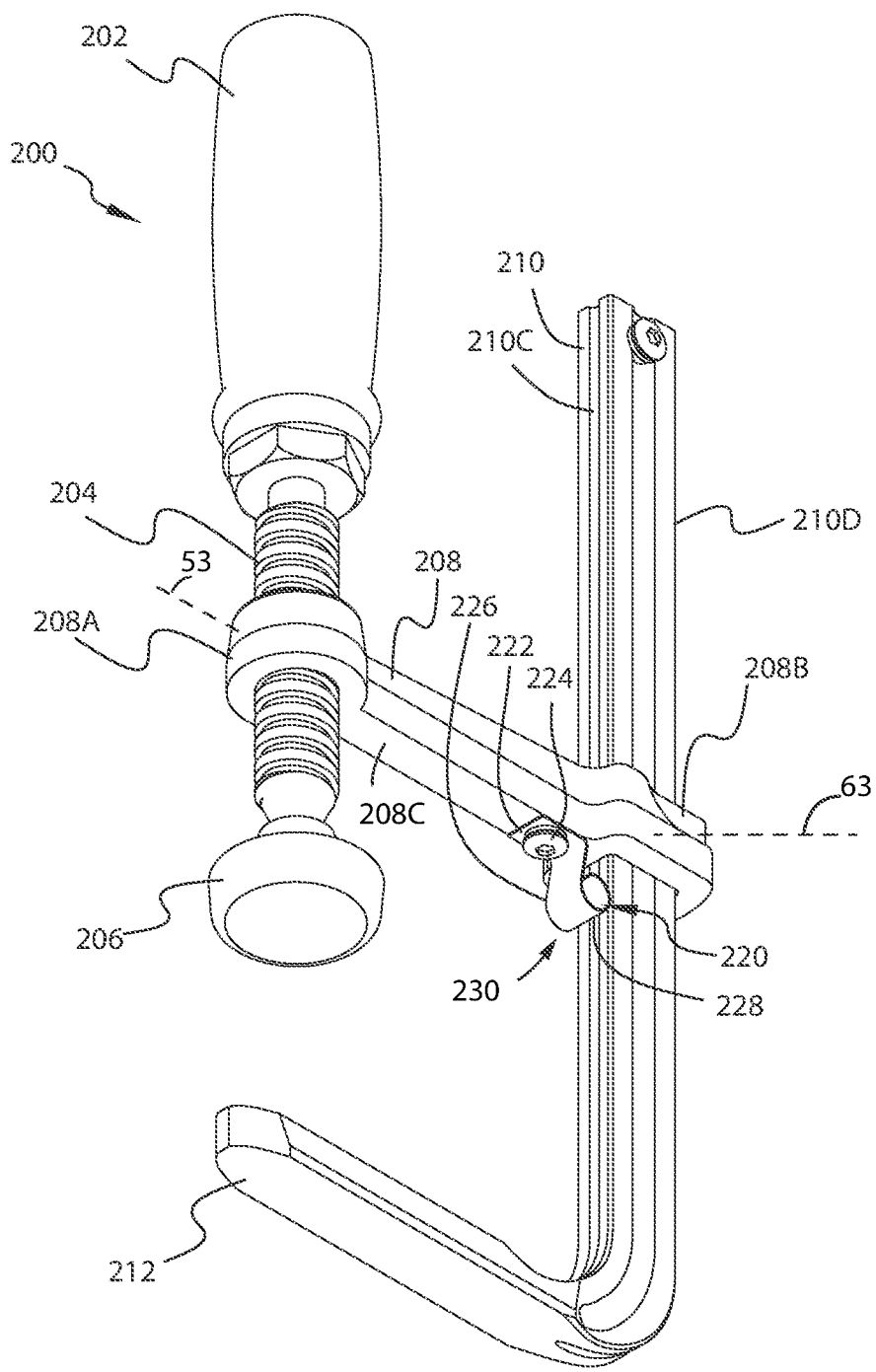
FIG. 19 is a perspective view of a third embodiment of the clamp including a pushing member in accordance with aspects of the invention.

FIG. 19 is a perspective view of a third embodiment. The clamp 200 has a similar configuration to that of the above described clamp 10, including handle 202, threaded shaft 204 and clamp head 206. In addition, the clamp 200 includes guide arm 208 in threaded engagement with the threaded shaft 204 at a first end 208A and in linear sliding engagement with first post 210 at its second end 208B. The clamp 200 further includes the clamping post 212 at an end of the first post 210. The first post 210 has a first side 210C facing the clamp head 206 and a second side 210D opposite the first side 210C.

The anti-pivot and lock mechanism 220 is operatively connected to the guide arm 208. More specifically, the anti-pivot and lock mechanism 220 engages the first side 210C of the first post 210 below the guide arm 208, or below the pivot axis 63 or below the longitudinal, central axis 53 of the guide arm 208. The anti-pivot and lock mechanism 220 includes a fix portion 222 adjacent an underside 208C of the guide arm 208 via which a fastener 224 secures the anti-pivot and lock mechanism 220 to the guide arm 208. The anti-pivot and lock mechanism 220 further includes a connection portion 226 that connects the fix portion 222 to a pushing portion 228. The pushing portion 228 presses on the first side 210C of the first post 210. This prevents downward pivot of the guide arm 208 relative to the first post 210. Further, this pushing creates an interaction between the guide arm 208 and the first post 210 that locks the guide arm 208 in a position relative to the first post 210. As has been described for the above embodiments, this interaction prevents the guide arm 208 from sliding down the first post 210. With the guide arm 210 locked into the position, the clamp head 266 is likewise locked into a position relative to the first post 210. The fix portion 222, the connection portion 226, and the pushing portion 228 collectively act as a spring 230.

Figure 20:
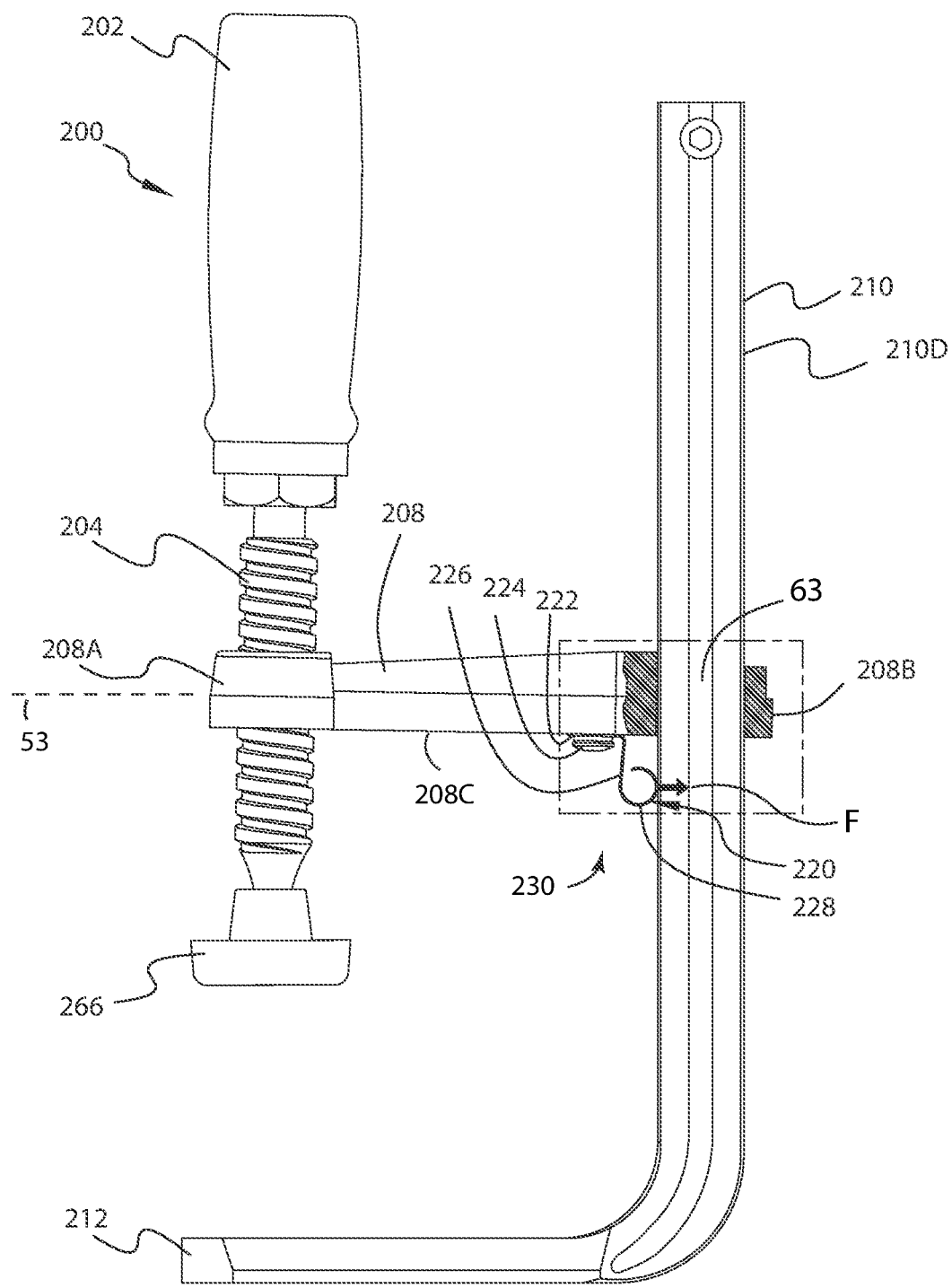
FIG. 20 is side elevational view of the clamp of FIG. 19.

FIG. 20 is side elevational view of the clamp 200 of FIG. 19. Force "F" is generated by the pushing portion 228 pressing on the first side 210C of the first post 210. In response to force "F", the first end 208A of the guide arm 208 is prevented from downward pivot and is instead lifted upward to create the engagement between the guide arm 208 and the first post 210 that holds the guide arm 210 in position relative to the first post 210.

Figure 21:
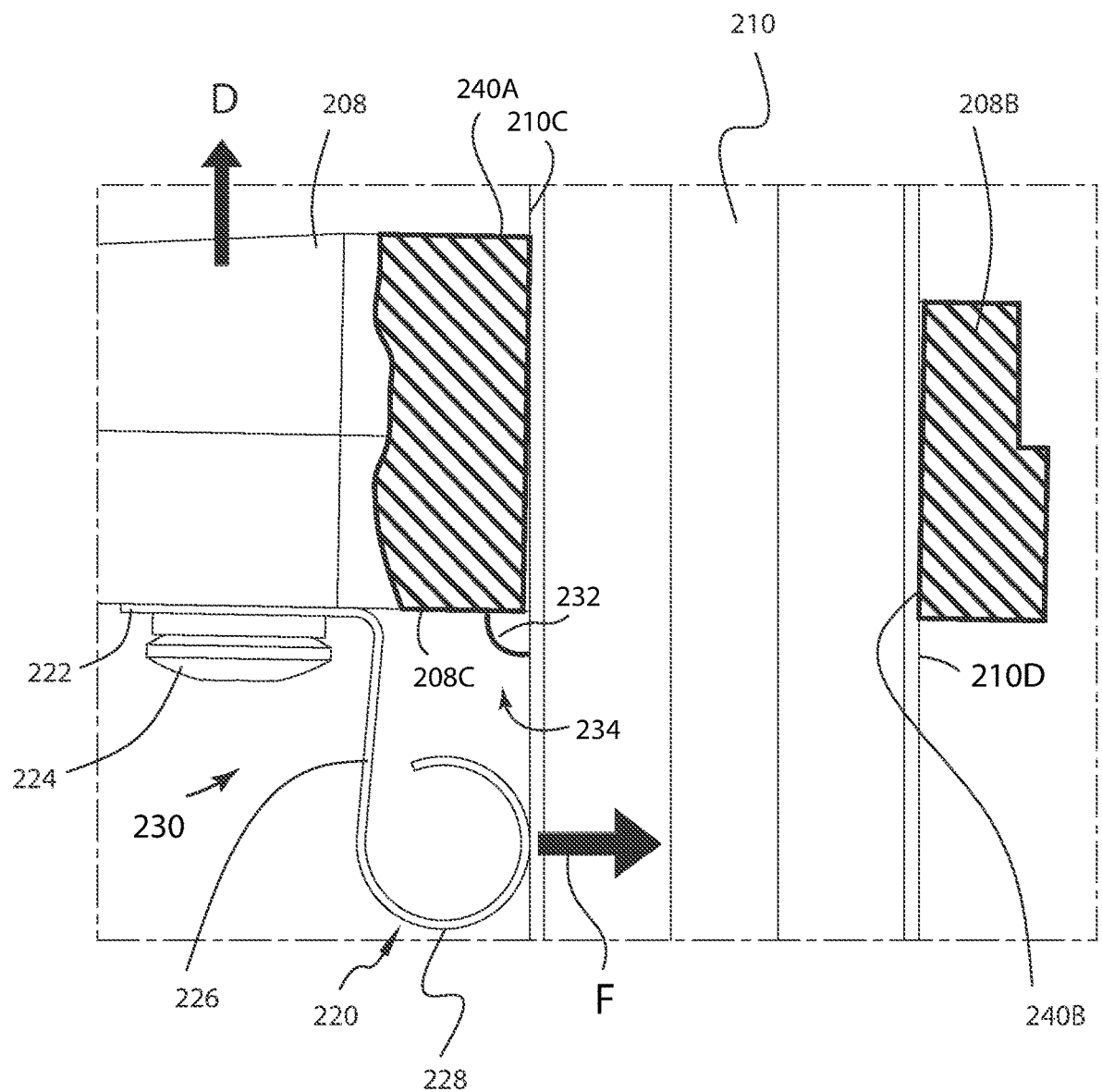
FIG. 21 is a partially enlarged view of the clamp of FIG. 19.

FIG. 21 shows the interface between the anti-pivot/lock mechanism 220 and the first post 210 and guide arm 208 in more detail. As the pushing portion 228 pushes on the first post 210, the guide arm 208 is lifted upward in direction "D" until edges 240A, 240B of the guide arm 208 engage the first side 210C and the second side 210D of the first post 210 respectively. This lifting action tends to increase an angle 232 between the underside 208C of the guide arm 208 and the first face 210C in the corner 234 in which the anti-pivot/lock mechanism 220 is disposed. The lifting action holds the guide arm 208 in position relative to the first post 210.

The fix portion 222 and the connection portion 226 are configured such that their inherent bias resiliently pushes the pushing portion 228 onto the first face 210C. The Artisan understands that various geometries could be used to produce the desired result of having the pushing portion 228 push on the first face 210C. Alternately, a coil spring could be used to supply the resilience needed to push the pushing portion 228 onto the first face 210C. The exact shape is not critical. The objective is that a spring force pushes the pushing portion 228 onto the first face 210C so that the guide arm 208 is lifted in direction D enough to cause edges 240A, 240B of the guide arm 208 to engage the first side 210C and the second side 210D of the first post 210, thereby holding the guide arm 208 in position relative to the first post 210 as shown in FIG. 21.

Figure 22:
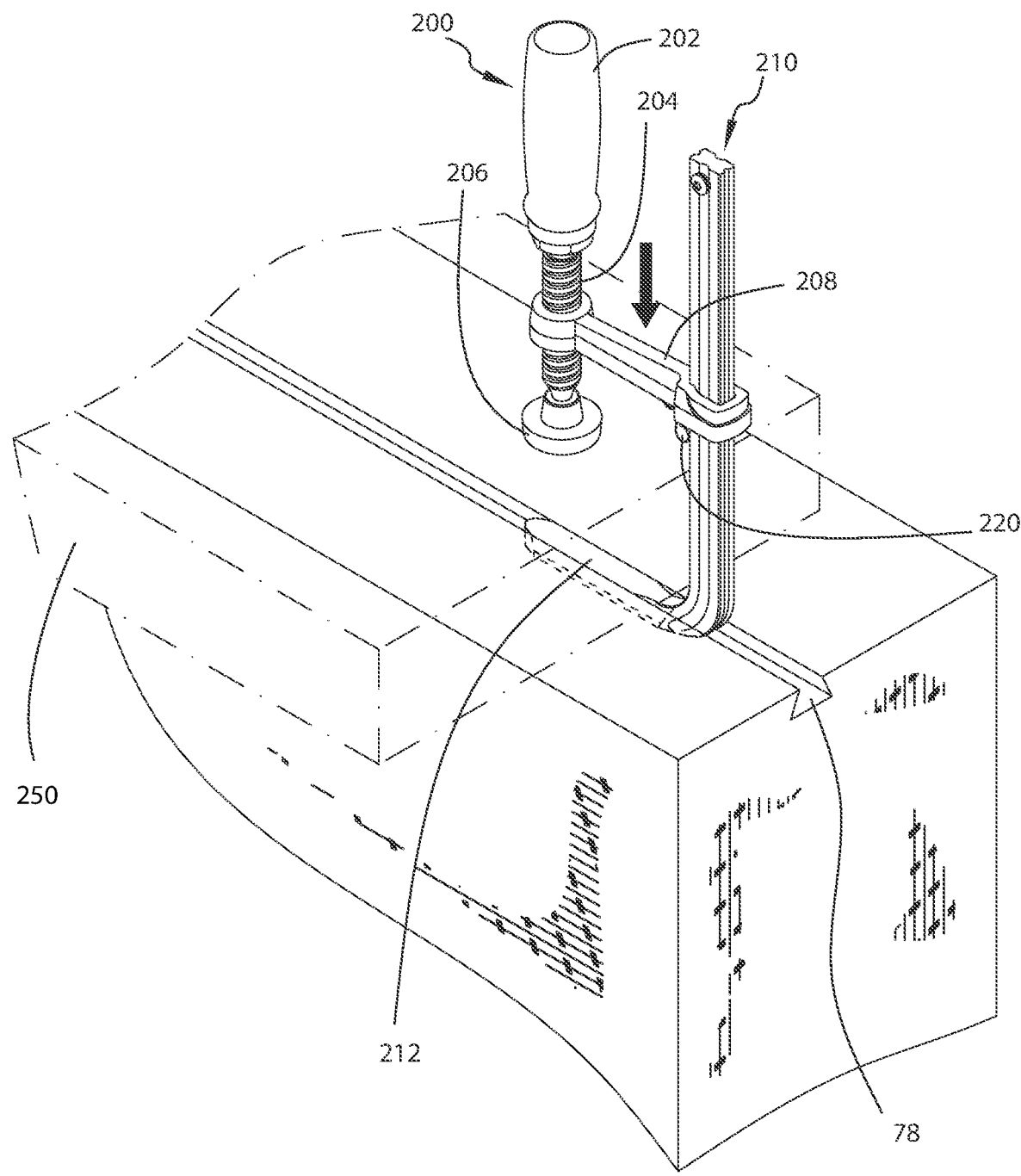
FIG. 22 is a schematic perspective view of the clamp of FIG. 19 in operation.

FIG. 22 is a schematic perspective view of the clamp 200 of FIG. 19 disposed in a channel and securing a workpiece 250 in position. Workpiece 250 is shown in phantom to indicate that the clamp 200 remains in position whether or not the workpiece 250 is present.

While the preferred embodiments of the present invention have been shown and described herein, it will be obvious that such embodiments are provided by way of example only. Numerous variations, changes and substitutions will occur to those of skill in the art without departing from the invention herein. Non-limiting examples include a component that is described above as being attached to one part of the apparatus may alternatively be attached to a different part of the apparatus in other embodiments. Parts described as being indirectly connected may be connected directly to each other, and vice versa. Component parts may be assembled from individual pieces or may be integrally formed as a single unit. Alternative types of connectors and alternative materials may be used. The apparatus may be used with other types of power tools. Accordingly, it is intended that the invention be limited only by the spirit and scope of the appended claims.

What is claimed is:

1. A clamp, comprising:
a component engagement member including a clamp head operatively connected to a handle;
a guide arm operatively connected to the component engagement member at a first end of the guide arm, and the guide arm comprises an opening at a second end distal the first end and the guide arm comprises a central axis from the first end to the second end;
a first post extending through the opening and in sliding engagement with the guide arm, and the first post comprises a first side facing the component engagement member and a second side opposite the first side, wherein the guide arm comprises a pivot axis at the second end thereof relative to the first post and the pivot axis is perpendicular to the central axis of the guide arm;
a second post at an end of the first post and disposed generally perpendicular to the first post and comprising a first end connected to the first post and a second end, distal the first end, and the second end is disposed opposite the clamp head; and,
an anti-pivot and lock mechanism operatively connected to the guide arm and the first post adjacent to the opening of the guide arm, wherein the anti-pivot and lock mechanism resiliently engages the first post below the pivot axis and the central axis of the guide arm.

2. The clamp of claim 1, wherein the anti-pivot and lock mechanism comprises a spring secured to an underside of the guide arm and in resilient contact with the first side.

3. The clamp of claim 1, wherein the anti-pivot and lock mechanism comprises a spring secured to an underside of the guide arm and configured to open an angle formed between the underside of the guide arm and the first side.

4. The clamp of claim 1, wherein the anti-pivot and lock mechanism is secured to an underside of the guide arm and is configured to slide along the first side of the first post as the guide arm is moved along the first post.

5. The clamp of claim 1, wherein the anti-pivot and lock mechanism comprises:
   a fix portion secured to an underside of the guide arm;
   a pushing portion in sliding and resilient contact with the first side of the first post; and,
   a connection portion connecting the fix portion to the pushing portion.

6. The clamp of claim 5, wherein the fix portion and the connection portion are configured to push the pushing portion onto the first side.

7. A clamp, comprising:
   a guide arm that comprises an opening at an end thereof; and a first post extending through the opening and in sliding engagement with the guide arm; and
   anti-pivot and lock mechanism comprising: a fix portion secured to an underside of the guide arm; a pushing portion in sliding and resilient contact with a first side of the first post; and a connection portion connecting the fix portion to the pushing portion,
   wherein the anti-pivot and lock mechanism is disposed in a corner formed by the underside of the guide arm and the first side of the first post and acts to increase an angle of the corner, thereby fixing a position of the guide arm relative to the first post.

8. The clamp of claim 7, wherein increasing the angle of the corner causes corners of the opening at the end of the guide arm to engage the first post, thereby fixing the position of the guide arm relative to the first post.

9. The clamp of claim 7, wherein the pushing portion is configured to slide along the first side of the first post as the guide arm is moved along the first post.

10. A clamp, comprising:
    a guide arm that comprises an opening at an end thereof; and a first post extending through the opening and in sliding engagement with the guide arm; and
    anti-pivot and lock mechanism comprising a spring disposed in a corner formed by an underside of the guide arm and a first side of the first post, wherein the spring acts to increase an angle of the corner, thereby fixing a position of the guide arm relative to the first post.

11. The clamp of claim 10, wherein the anti-pivot and lock mechanism is secured to the underside of the guide arm and in sliding contact with the first side of the first post.

12. The clamp of claim 11, wherein the anti-pivot and lock mechanism comprises a fix portion secured to the underside of the guide arm; a pushing portion in sliding and resilient contact with the first side of the first post; and a connection portion connecting the fix portion to the pushing portion, wherein the fix portion, the pushing portion, and the connection portion together form the spring.

13. The clamp of claim 10, wherein increasing the angle of the corner causes corners of the opening of the guide arm to engage the first post, thereby fixing the position of the guide arm relative to the first post.

* * * * *